United States Patent
Dalfra et al.

(10) Patent No.: US 11,003,192 B2
(45) Date of Patent: May 11, 2021

(54) AUTOMATIC WORKING SYSTEM AND CONTROL METHOD THEREOF AND AUTOMATIC MOVING DEVICE

(71) Applicant: Positec Power Tools (Suzhou) Co., Ltd, Jiangsu (CN)

(72) Inventors: Davide Dalfra, Villimpenta (IT); Emanuel Conti, Falciano (IT)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 349 days.

(21) Appl. No.: 15/775,222

(22) PCT Filed: Nov. 4, 2016

(86) PCT No.: PCT/CN2016/104718
§ 371 (c)(1),
(2) Date: Nov. 13, 2018

(87) PCT Pub. No.: WO2017/080408
PCT Pub. Date: May 18, 2017

(65) Prior Publication Data
US 2019/0064842 A1    Feb. 28, 2019

(30) Foreign Application Priority Data
Nov. 10, 2015 (CN) .......................... 201510771679.9

(51) Int. Cl.
*G05D 1/02* (2020.01)
*A01D 34/00* (2006.01)
(Continued)

(52) U.S. Cl.
CPC ......... *G05D 1/0259* (2013.01); *A01D 34/008* (2013.01); *G05D 1/02* (2013.01);
(Continued)

(58) Field of Classification Search
USPC .......................................... 701/23
See application file for complete search history.

(56) References Cited

U.S. PATENT DOCUMENTS

| 6,300,737 B1 | 10/2001 | Bergvall et al. |
| 7,613,543 B2 | 11/2009 | Petersson et al. |

(Continued)

FOREIGN PATENT DOCUMENTS

| AT | 226740 | 11/2002 |
| AT | 533096 | 11/2011 |

(Continued)

OTHER PUBLICATIONS

Translation of International Search Report for PCT/CN2016/104718 dated Jan. 25, 2017.

*Primary Examiner* — Tyler D Paige
(74) *Attorney, Agent, or Firm* — Middleton Reutlinger

(57) ABSTRACT

Disclosed is an apparatus and a control method of an automatic working system, and the control method comprises the following steps: generating a boundary signal by a signal generating apparatus; generating an electromagnetic field as the boundary signal flows by the boundary wire; detecting the electromagnetic field by an automatic moving device to at least generate a first detection signal and a second detection signal, and multiplying the first detection signal and the second detection signal to generate a product signal; determining a first signal point and a second signal point by the product signal; generating characteristic values based on parameters of the first signal point and the second signal point, comparing the characteristic values with preset thresholds, and judging whether the first detection signal is interfered by noise, thereby effectively removing an interference signal. Also disclosed is an automatic working system executing the above control method.

33 Claims, 19 Drawing Sheets

(51) Int. Cl.
  *A47L 9/28* (2006.01)
  *A47L 11/40* (2006.01)
  *A01D 101/00* (2006.01)

(52) U.S. Cl.
  CPC ......... *A01D 2101/00* (2013.01); *A47L 9/2826* (2013.01); *A47L 9/2852* (2013.01); *A47L 11/4061* (2013.01); *A47L 2201/04* (2013.01); *G05D 2201/0208* (2013.01)

(56) References Cited

U.S. PATENT DOCUMENTS

| | | | |
|---|---|---|---|
| 8,046,103 | B2 | 10/2011 | Abramson et al. |
| 8,532,822 | B2 | 9/2013 | Abramson et al. |
| 8,818,602 | B2 | 8/2014 | Yamanura et al. |
| 9,072,218 | B2 | 7/2015 | Johnson et al. |
| 9,903,947 | B2 | 2/2018 | Das et al. |
| 2007/0027578 | A1* | 2/2007 | Colens ................. G05D 1/0265 700/245 |
| 2007/0142964 | A1* | 6/2007 | Abramson ............. A47L 9/009 700/245 |
| 2008/0039974 | A1* | 2/2008 | Sandin ................. G05D 1/0261 700/258 |
| 2008/0097645 | A1 | 4/2008 | Abramson et al. |
| 2010/0305752 | A1* | 12/2010 | Abramson .......... G05D 1/0225 700/245 |
| 2011/0202307 | A1 | 8/2011 | Petereit et al. |
| 2011/0234153 | A1* | 9/2011 | Abramson .......... G05D 1/0265 320/107 |
| 2012/0041594 | A1 | 2/2012 | Abramson et al. |
| 2013/0006418 | A1* | 1/2013 | Tian .................... G05D 1/0225 700/245 |
| 2014/0012418 | A1 | 1/2014 | Johnson et al. |
| 2015/0328775 | A1* | 11/2015 | Shamlian ............ G05D 1/0234 700/258 |
| 2015/0373906 | A1 | 12/2015 | Jagenstedt et al. |
| 2016/0014955 | A1 | 1/2016 | Hans |
| 2016/0109241 | A1 | 4/2016 | Eguchi et al. |

FOREIGN PATENT DOCUMENTS

| | | |
|---|---|---|
| AU | 9194698 | 4/1999 |
| AU | 751789 | 8/2002 |
| AU | 2003244282 | 12/2003 |
| CA | 2303923 | 4/1999 |
| CN | 100374963 | 8/2005 |
| CN | 102187289 | 9/2011 |
| CN | 102187289 A | 9/2011 |
| CN | 103197672 | 7/2013 |
| CN | 103488172 | 1/2014 |
| CN | 103542800 | 1/2014 |
| CN | 103542800 A | 1/2014 |
| CN | 103543745 | 1/2014 |
| CN | 103809592 | 5/2014 |
| CN | 103941600 | 7/2014 |
| CN | 103941600 A | 7/2014 |
| CN | 104981747 | 10/2015 |
| CN | 104981747 A | 10/2015 |
| CN | 105009014 | 10/2015 |
| CN | 105009014 A | 10/2015 |
| CN | 103425132 | 3/2016 |
| CN | 106168484 | 11/2016 |
| CN | 103869813 | 2/2017 |
| CN | 104252174 | 8/2017 |
| CN | 104252175 | 9/2017 |
| DE | 29824544 | 8/2001 |
| DE | 69808964 | 11/2002 |
| DE | 60313865 | 1/2008 |
| DE | 102009001900 | 4/2010 |
| DE | 102016009087 | 2/2017 |
| DK | 1612631 | 2/2012 |
| EP | 1025472 | 8/2000 |
| EP | 1612631 | 1/2006 |
| EP | 1612631 A2 | 1/2006 |
| EP | 1512053 | 5/2007 |
| EP | 1906205 | 4/2008 |
| EP | 2296005 | 3/2011 |
| EP | 2382516 | 11/2011 |
| EP | 2502481 | 2/2013 |
| EP | 2684438 | 1/2014 |
| EP | 2741160 | 6/2014 |
| EP | 2667271 | 3/2015 |
| EP | 3048732 | 7/2016 |
| ES | 2372603 | 1/2012 |
| GB | 2542674 | 3/2017 |
| JP | 0399304 | 4/1991 |
| JP | 0399304 A | 4/1991 |
| JP | 2766334 | 6/1998 |
| JP | 4246701 | 4/2009 |
| JP | 5869954 | 2/2016 |
| JP | 6307748 | 4/2018 |
| KR | 1474130 | 12/2014 |
| SE | 510524 | 5/1999 |
| WO | 9915941 | 4/1999 |
| WO | 2003104908 | 12/2003 |
| WO | 2010046260 | 4/2010 |
| WO | 2013102417 | 7/2013 |
| WO | 2013185622 | 12/2013 |
| WO | 2014013473 | 1/2014 |
| WO | 2014086498 | 6/2014 |
| WO | 2014129944 | 8/2014 |
| WO | 2016184398 | 11/2016 |

* cited by examiner

AUTOMATIC WORKING SYSTEM AND CONTROL METHOD THEREOF AND AUTOMATIC MOVING DEVICE

TECHNICAL FIELD

The present invention relates to an automatic working system, in particular to a system controlling an automatic moving device to work in a working region.

The present invention relates to a control method, in particular to a control method controlling an automatic moving device to work in a working region.

The present invention relates to an automatic moving device, in particular to an automatic moving device to work and move in a working region.

BACKGROUND

Along with the development of science and technology, people have known various types of intelligent automatic moving device very well, since the automatic moving device can execute a preset relevant task according to an automatically preset program without manual operation and intervention, the automatic moving device is very widely applied to industrial application and household products. The automatic moving device applied to the industrial application comprises for example robots executing various functions, and the automatic moving device applied to the household products comprises a mower, a dust collector, etc., these automatic moving devices greatly save time for people, and bring great convenience to industrial production and household living.

Such automatic moving device generally automatically moves in a preset working region without departing from the preset working region. The outer boundary of the preset working region is usually determined by adopting an electrical boundary wire. The boundary wire is usually a common electric wire.

A current flows by the boundary wire marked by the outer boundary of the working region. The generated electric field or magnetic field can be detected by a proper sensor in the automatic moving device, the detected signal is then transmitted to a controller in the automatic moving device, and the controller compares the obtained signal with a preset judging condition in a memory, to obtain the conclusion whether the automatic moving device is in the working region.

As shown in FIG. 1, in one simple prior art implementation, an automatic working system comprises a signal generating apparatus 80', a boundary wire 50' electrically connected to the signal generating device and an automatic moving device 10'; the boundary wire 50' defines a working region 30' surrounded by the boundary wire 50' and a non-working region 70' outside the boundary wire 50'. The signal generating apparatus 80' generates a periodical current signal SS as shown in FIG. 2. The current signal SS generates an electromagnetic field 90' changed with the boundary wire 50' as a center when flowing by the boundary wire 50'. At any moment, the polarity of the electromagnetic field 90' in the working region 30' is opposite to that of the electromagnetic field 90' in the non-working region 70'.

The automatic moving device 10' further comprises a signal detection apparatus 20' and a controller 190' (not shown in the drawing). The signal detection apparatus 20' usually is a sensing coil, which senses the changed electromagnetic field 90' to generate a detection signal SJ', such as alternating-current voltage or alternating-current current.

The controller 190' receives the signal detection signal SJ' and compares the detection signal SJ' with a preset threshold, and when the amplitude value of the voltage or current exceeds the threshold, the controller 190' indicates the automatic moving device 10' to depart from the boundary wire 50' of the working region. When the automatic working device crosses over the boundary 50' and enters the non-working region 70', since the polarity of the magnetic field 90' is inverted, the phase of the detection signal SJ' sensed by the signal detection apparatus 110' is also inverted accordingly. The controller 190' judges that the automatic moving device is in the non-working region 70' by identifying that the phase of the detection signal SJ' is different from the preset phase in direction.

In an actual working scene, the automatic working device 10' is necessarily provided with a motor driving the automatic moving device to move, for example a motor driving the automatic moving device to mow grass or collect dust or other working parts to work, and the operation of the motor generates an electromagnetic field. The electromagnetic field is also sensed by the signal detection apparatus 110' and a voltage or current signal is generated. Therefore, the detection signal SJ' received by the controller 190' actually contains an interference signal brought by the motor. When the controller 190' adopts the interfered detection signal SJ' to judge and control, a wrong judgment on inside and outside often occurs and a control command not according with an actual condition is sent.

In the actual working scene, when different adjacent working regions exist, the electromagnetic fields generated by the boundary lines of different working regions cross with each other. Therefore, the detection signals sensed by the automatic moving devices in respective working regions necessarily contain the interference brought by the adjacent electromagnetic field. Therefore, the detection signal SJ' received by each controller 190' actually contains the interference signal brought by the electromagnetic field in the adjacent working region. When the controller 190' adopts the interfered detection signal SJ' to judge and control, a wrong judgment on inside and outside often occurs and a control command not according with an actual condition is sent.

In the actual working region, the automatic moving device 10' necessarily works in a free space, and various electromagnetic waves sent from all kinds of radio devices or other types of devices exist in the free space. At certain moment, certain specific electromagnetic signal may be detected by the signal detection apparatus 110'. Therefore, the detection signal SJ' received by each controller 190' actually contains the interference signal brought by the electromagnetic waves in the free space. When the controller 190' adopts the interfered detection signal SJ' to judge and control, a wrong judgment on inside and outside often occurs and a control command not according with an actual condition is sent.

Therefore, in order to avoid the wrong judgment problem caused by noise interference and enable the controller to send a more correct control command, it is required to design a control method capable of effectively eliminating or reducing above various interference noises and an automatic working system applying the control method.

SUMMARY

In order to overcome defects of the prior art, embodiments of the invention aim to solve the problem about providing an automatic working system and method which eliminates or reduces the signal interference.

In order to solve above problems, technical solution of the invention is a control method of an automatic working system, comprising the following steps: providing a signal generation apparatus configured to generate a current signal, the current signal flowing by a boundary wire to generate an electromagnetic field; providing an automatic moving device, the automatic moving device being provided with a plurality of detection devices configured to detect said electromagnetic field; detecting said electromagnetic field by said plurality of detection devices to generate a plurality of detection signals respectively; multiplying said plurality of detection signals to generate a product signal, the direction of said product signal being kept same as that one of said plurality of detection signals; determining a first signal point and a second signal point based on said product signal; generating characteristic values based on parameters of said first signal point and said second signal point, comparing said characteristic values with preset thresholds and obtaining a comparison result, and judging whether said one of said plurality of detection signals is interfered by noise according to said comparison result.

Preferably, said plurality of detection devices comprising a first detection device and a second detection device; detecting said electromagnetic field by said first detection device and said second detection device to generate a first detection signal and a second detection signal respectively; said first detection signal is said one of said plurality of detection signals.

Preferably, said first signal point is on said first detection signal and its position is corresponding to the position of a maximal value point of said product signal; and said second signal point is on said first detection signal and its position is corresponding to the position of a minimal value point of said product signal.

Preferably, said first signal point is on said second detection signal and its position is corresponding to the position of a maximal value point of said product signal; and said second signal point is on said second detection signal and its position is corresponding to the position of a minimal value point of said product signal.

Preferably, said first signal point is a maximal value point of said product signal; and said second signal point is a minimal value point of said product signal.

Preferably, said characteristic values comprise an amplitude value of said first signal point, and said amplitude value is defined as a peak value; said characteristic values also comprise an amplitude value of said second signal point, and said amplitude value is defined as a valley value; said preset thresholds comprise a threshold value; the absolute values of said peak value and said valley value are compared with said threshold value respectively, if said absolute values of the peak value and said valley value are both larger than said threshold value, said first detection signal is judged not to be interfered by the noise, otherwise, said first detection signal is judged to be interfered by the noise.

Preferably, said characteristic values comprise a time difference between said first signal point and said second signal point, which is defined as a peak-valley time difference; said preset thresholds value comprises an interval lower limit value and an interval upper limit value; when said absolute values of said peak value and said valley value are both larger than said threshold value, said peak-valley time difference is compared with the interval lower limit value and the interval upper limit value, if said peak-valley time difference is larger than or equal to said interval lower limit value and smaller than or equal to said interval upper limit value, said first detection signal is judged not to be interfered, otherwise, said first detection signal is judged to be interfered by the noise.

Preferably, said characteristic values comprise a time difference between said first signal point and said second signal point, which is defined as a peak-valley time difference; said preset thresholds value comprises an interval lower limit value and an interval upper limit value; said peak-valley time difference is compared with said interval lower limit value and said interval upper limit value, if said peak-valley time difference is larger than or equal to said interval lower limit value and smaller than or equal to said interval upper limit value, said first detection signal is judged not to be interfered, otherwise, said first detection signal is judged to be interfered by the noise.

Preferably, value ranges of said interval lower limit value and said interval upper limit value are based on a period of said current signal.

Preferably, said characteristic values comprise an amplitude value difference between said first signal point and said second signal point, which is defined as a peak-valley amplitude difference; said preset thresholds value comprises an amplitude value; said peak-valley amplitude difference is compared with said amplitude value when said peak-valley time difference is larger than or equal to said interval lower limit value and smaller than or equal to said interval upper limit value, if said peak-valley amplitude difference is smaller than or equal to said amplitude value, said first detection signal is judged not to be interfered, otherwise, said first detection signal is judged to be interfered by the noise.

Preferably, said characteristic values comprise an amplitude value difference between said first signal point and said second signal point, which is defined as a peak-valley amplitude difference; said preset thresholds value comprises an amplitude value; said peak-valley amplitude difference is compared with said amplitude value, if said peak-valley amplitude difference is smaller than or equal to said amplitude value, said first detection signal is judged not to be interfered, otherwise, said first detection signal is judged to be interfered by the noise.

Preferably, if said first detection signal is not interfered by the noise, then a time sequence relation between said first signal point and said second signal point is compared, then said first detection device generating said first detection signal is judged to be located in or out said working region encircled by said boundary wire.

Preferably, the method of keeping the direction of said product signal and that of said first detection signal same comprises: solving the absolute value of said second detection signal, then multiplying said absolute value of said second detection signal by said first detection signal, to generate said product signal.

Preferably, said first detection signal and said second detection signal are multiplied after being subjected to analog digital conversion.

Preferably, characteristic values comprise a position coordinate index corresponding to the maximal value of said product signal, and such index is defined as a large value index; said characteristic values also comprise a position coordinate index corresponding to the minimal value of said product signal, and such index is defined as a small value index.

Preferably, said characteristic values also comprise an amplitude value of said first detection signal at said large value index, which is defined as a peak value; and said characteristic values also comprise an amplitude value of said first detection signal at said small value index, which is defined as a valley value.

Preferably, after said product signal is subjected to optimal filtering, said first signal point and said second signal point are then determined based on said product signal subjected to said optimal filtering.

Preferably, an optimal filtering core of said optimal filtering is corresponding to said current signal generated by said signal generating apparatus.

Preferably, said optimal filtering core of said optimal filtering is a detection signal in said working region defined by said boundary wire.

In order to solve above problems, technical solution of the invention is an automatic working system, comprising: a signal generation apparatus, configured to generate a current signal; a boundary wire, forming an electric loop with the signal generating apparatus, wherein said current signal flows by said boundary wire to generate an electromagnetic field; an automatic moving device, automatically moving and working in a working region defined by said boundary wire; said automatic moving device comprises a processor, a controller and a plurality of detection devices configured to detect said electromagnetic field; detecting said electromagnetic field by said plurality of detection devices to generate a plurality of detection signals respectively; said processor receives said plurality of detection signals, and multiplies said plurality of detection signals to generate a product signal, and the direction of said product signal being kept same as that one of said plurality of detection signals; a first signal point and a second signal point are determined based on said product signal; characteristic values are generated based on parameters of said first signal point and said second signal point, said characteristic values are compared with preset thresholds to generate a comparison result which is transmitted to said controller; and said controller judges whether said one of said plurality of detection signals is interfered by noise according to said comparison result.

Preferably, said plurality of detection devices comprising a first detection device and a second detection device; detecting said electromagnetic field by said first detection device and said second detection device to generate a first detection signal and a second detection signal respectively; and the direction of said product signal being kept same as that of said first detection signal; said first detection signal is said one of said plurality of detection signals.

Preferably, said first signal point is on said first detection signal and its position is corresponding to the position of a maximal value point of said product signal; and said second signal point is on said first detection signal and its position is corresponding to the position of a minimal value point of said product signal.

Preferably, said first signal point is on said second detection signal and its position is corresponding to the position of a maximal value point of said product signal; and said second signal point is on said second detection signal and its position is corresponding to the position of a minimal value point of said product signal.

Preferably, said first signal point is a maximal value point of said product signal; and said second signal point is a minimal value point of said product signal.

Preferably, the characteristic values comprise an amplitude value of said first signal point, and said amplitude value is defined as a peak value; said characteristic values also comprise an amplitude value of said second signal point, and said amplitude value is defined as a valley value; said preset thresholds comprise a threshold value; the absolute values of said peak value and said valley value are compared with said threshold value respectively, if the absolute values of said peak value and said valley value are both larger than said threshold value, said first detection signal is judged not to be interfered by the noise, otherwise, said first detection signal is judged to be interfered by the noise.

Preferably, said characteristic values comprise a time difference between said first signal point and said second signal point, which is defined as a peak-valley time difference; said preset thresholds value comprises an interval lower limit value and an interval upper limit value; said peak-valley time difference is compared with said interval lower limit value and said interval upper limit value, if said peak-valley time difference is larger than or equal to said interval lower limit value and smaller than or equal to said interval upper limit value, said first detection signal is judged not to be interfered, otherwise, said first detection signal is judged to be interfered by the noise.

Preferably, said value ranges of said interval lower limit value and said interval upper limit value are based on a period of said current signal.

Preferably, said characteristic values comprise an amplitude value difference between said first signal point and said second signal point, which is defined as a peak-valley amplitude difference; said preset thresholds value comprises an amplitude value; said peak-valley amplitude difference is compared with said amplitude value, if said peak-valley amplitude difference is smaller than said amplitude value, said first detection signal is judged not to be interfered, otherwise, said first detection signal is judged to be interfered by the noise.

Preferably, said first detection signal and said second detection signal are multiplied after being subjected to analog digital conversion.

Preferably, the method of keeping the direction of said product signal and that of said first detection signal same comprises: solving the absolute value of said second detection signal, then multiplying said absolute value of said second detection signal by said first detection signal, to generate said product signal.

Preferably, if said controller judges that said first detection signal is not interfered by the noise, said processor compares a time sequence relation between said first signal point and said second signal point, said first detection device generating said first detection signal is judged to be located in or out said working region encircled by said boundary wire.

Preferably, said controller sends a corresponding control command to control a direction of said automatic moving device according to a position relation between said first detection device and said boundary wire.

Preferably, when said controller judges that said first detection signal is interfered by the noise, said controller judges that an effective signal is not received in such processing period.

Preferably, said processor also comprises an optimal filter, after said product signal is subjected to optimal filtering, said first signal point and said second signal point are then determined based on said product signal subjected to said optimal filtering.

Preferably, an optimal filtering core of said optimal filtering is corresponding to a current signal generated by said signal generating apparatus.

Preferably, said optimal filtering core of said optimal filtering is a detection signal in said working region defined by said boundary wire.

In order to solve above problems, technical solution of the invention is an automatic moving device, automatically moving and working in a working region defined by a boundary wire, and comprising: a processor, a controller and a plurality of detection devices configured to detect said boundary wire, detecting said boundary wire by said plurality of detection devices to generate a plurality of detection signals respectively; said processor receives said plurality of detection signals, and multiplies said plurality of detection signals to generate a product signal, and the direction of said product signal being kept same as that one of said plurality of detection signals; a first signal point and a second signal point are determined based on said product signal; characteristic values are generated based on parameters of said first signal point and said second signal point, said characteristic values are compared with preset thresholds to generate a comparison result which is transmitted to said controller; and said controller judges whether said one of said plurality of detection signals is interfered by noise according to the comparison result.

Preferably, said plurality of detection devices comprising a first detection device and a second detection device; detecting said boundary wire by said first detection device and said second detection device to generate a first detection signal and a second detection signal respectively; and the direction of said product signal being kept same as that of said first detection signal; said first detection signal is said one of said plurality of detection signals.

Preferably, said first detection device and said second detection device are symmetric about a central axis of said automatic moving device.

Preferably, a transverse distance between said first detection device and said second detection device is larger than or equal to 80 mm.

Preferably, said first detection device and said second detection device are respectively located in different sides of the motor of said automatic moving device.

In order to solve above problems, technical solution of the invention is a control method of an automatic working system, characterized by comprising the following steps: providing a signal generating apparatus configured to generate a current signal, said current signal flowing by a boundary wire to generate an electromagnetic field; providing an automatic moving device, said automatic moving device having a plurality of detection devices which are configured to detect said electromagnetic field; detecting said electromagnetic field by said plurality of detection devices to generate a plurality of detection signals respectively; multiplying said plurality of detection signals to generate a product signal; and judging whether one of said plurality of detection signals is interfered by noise based on said product signal.

Preferably, a first signal point and a second signal point are determined based on said product signal, characteristic values are generated based on parameters of said first signal point and said second signal point, said characteristic values are compared with preset thresholds to obtain a comparison result, and according to said comparison result, whether one of said plurality of detection signals is interfered by noise is judged.

Preferably, signals which are smaller than a specific intensity value are filtered based on said product signal, and whether one of said plurality of detection signals is interfered by noise is judged according to said filtering result.

In order to solve above problems, technical solution of the invention is an automatic working system, comprising: a signal generating apparatus, configured to generate a current signal; a boundary wire, forming an electric loop with said signal generating apparatus, wherein said current signal flows by said boundary wire to generate an electromagnetic field; an automatic moving device, automatically moving and working in a working region defined by said boundary wire; wherein said automatic moving device comprises a processor, a controller and a plurality of detection devices which are configured to detect said electromagnetic field; detecting said electromagnetic field by said plurality of detection devices to generate a plurality of detection signals respectively; said processor receives said plurality of detection signals, and multiplies said plurality of detection signals to generate a product signal; and said controller judges whether one of said plurality of detection signals is interfered by noise based on said product signal.

In order to solve above problems, technical solution of the invention is an automatic moving device, automatically moving and working in a working region defined by a boundary wire, wherein said automatic moving device comprises: a processor, a controller and a plurality of detection devices second detection device configured to detect said boundary wire; detecting said boundary wire by said plurality of detection devices to generate a plurality of detection signals respectively; said processor receives said plurality of detection signals, and multiplies said plurality of detection signals to generate a product signal; and said controller judges whether one of said plurality of detection signals is interfered by noise based on said product signal.

The present invention has several beneficial effects. By effectively identifying the detected signal, the signal interference caused by the environment and motors are effectively removed, and the anti-interference capacity of the automatic working system is improved. An effective signal identifying control algorithm comprises a multiplying step, a corresponding step and a comparing and judging step, and the effective signal identifying control algorithm is effective and simple. By digitalizing the detected signal and then performing the effective signal identifying process, not only is the efficiency of the automatic working system is improved, but also the hardware implementing difficulty for effective signal identification is reduced.

BRIEF DESCRIPTION OF THE DRAWINGS

The above solved technical problem, technical solution and beneficial effects of the present invention can be clearly obtained by the detailed description of the preferable specific embodiments capable of realizing the present invention in combination with the description of the drawings.

Same numbers and signs in the drawings and the description are used for representing the same or equivalent elements.

| | |
|---|---|
| 10/10', automatic moving device | 30/30', working region |
| 50/50', boundary wire | 70/70', non-working region |
| 80/80', signal generation apparatus | 90/90', electromagnetic field |
| 102, shell | 104, wheel |
| 106, motor | 110', signal detection device |
| 1101, first detection device | 1102, second detection device |
| 1301, first conditioning circuit | 1302, second conditioning circuit |
| 150, microprocessor | 170, differential digital analog converter |
| 1702, memory | 190/190', controller |

DETAILED DESCRIPTION

Detailed description and technical content about the present invention are described as follows in combination with the drawings; however, the appended drawings merely provide reference rather than limiting the present invention.

Figure 1:
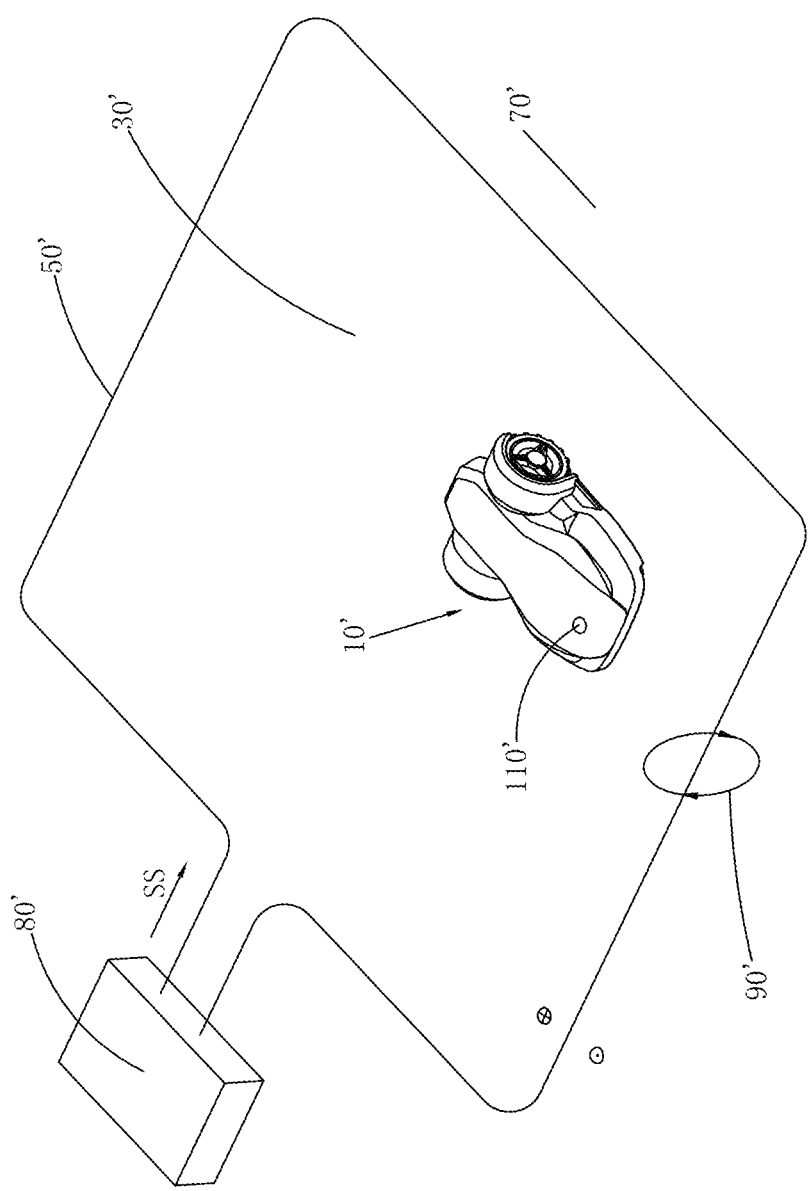
FIG. 1 is a schematic diagram of an automatic working system in prior art.
Figure 2:
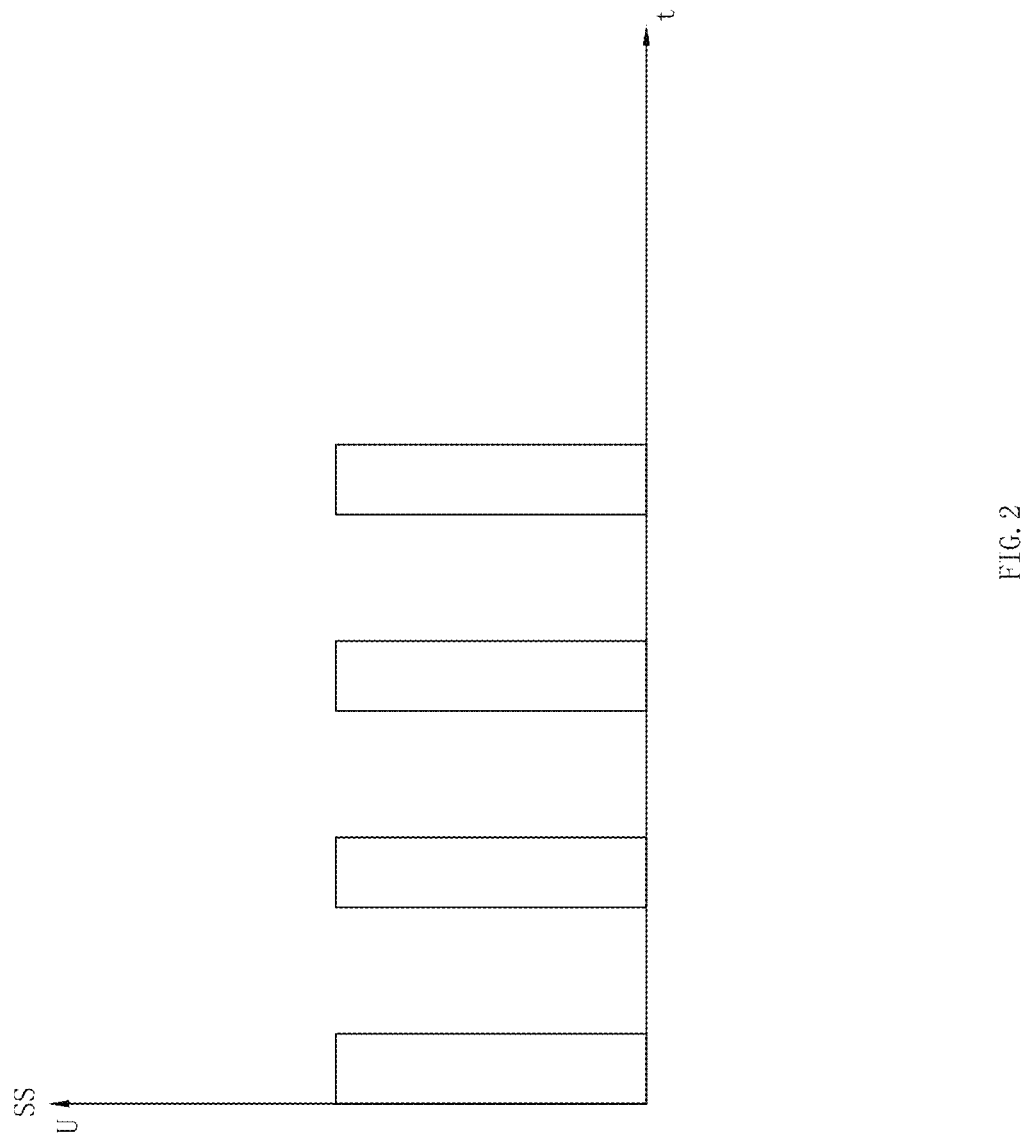
FIG. 2 is a schematic diagram of a current signal in the automatic working system as shown in FIG. 1.
Figure 3:
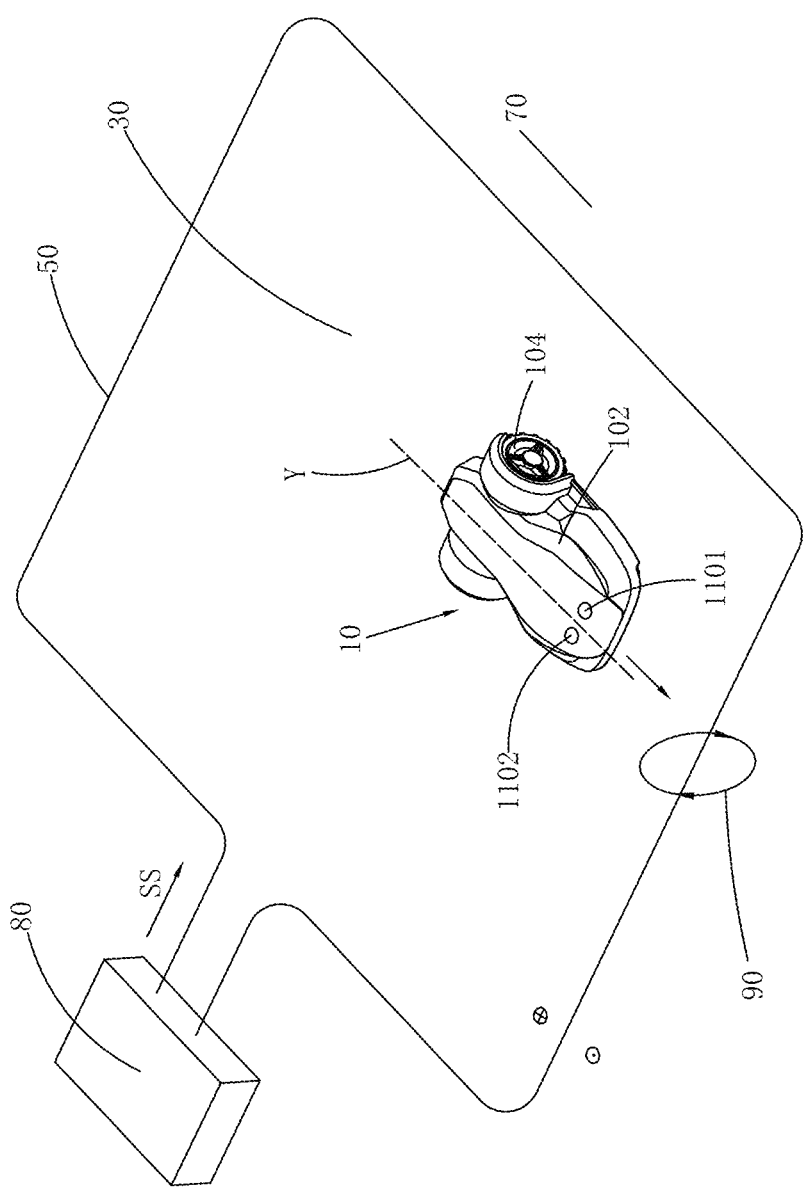
FIG. 3 is a schematic diagram of an automatic working system of a preferable embodiment of the present application.

The automatic working system as shown in FIG. 3 comprises a signal generating apparatus 80, an automatic moving device 10 and a boundary wire 50, the signal generating apparatus 80 is electrically connected to the boundary wire 50. The signal generating apparatus 80 generates a current signal SS as shown in FIG. 2 and sends to the boundary wire 50, and the current signal generates a changed electromagnetic field 90 when flowing by the boundary wire 50. It is known by those skilled in the art that the current signal SS may not adopt a periodical pulse voltage signal as shown in FIG. 2 and adopts other types of signal forms capable of generating a changed magnetic field. The boundary wire 50 is configured to dividing a specific region into an inner region and an outer region, the range located in the boundary wire 50 is defined as a working region 30, and the range located outside the boundary wire 50 is defined as a non-working region 70.

The automatic moving device 10 can be automatic or semi-automatic machines such as an intelligent mower or cleaning robot. In this embodiment, the automatic moving device 10 can be an intelligent mower. As shown in FIG. 3, the automatic moving device 10 comprises a shell 102, a plurality of wheels 104 located on the bottom of the shell 102, a motor 106 (not shown) located in the shell 102, and a controller 190 controlling the automatic moving device 10 to automatically work and move (not shown). It is known by those skilled in the art that the number of the motor 106 can be one or more, and the motor 106 is configured to drive the wheels 104 to move or to drive a working part (not shown) of the automatic moving device to mow grass.

Here, a normal walking direction of the automatic moving device 10 is defined as the front direction of the automatic moving device 10, the direction opposite to the front direction is the back direction of the automatic moving device 10, and based on the defined front and back directions of the automatic moving device 10, the automatic moving device 10 also comprises left and right sides located between the front and back directions.

The automatic moving device 10 comprises at least two detection devices configured to detect the electromagnetic field 90. In this embodiment, as shown in FIG. 3, the automatic moving device comprises a first detection device 1101 and a second detection device 1102. The first detection device 1101 and the second detection device 1102 respectively sense the change of the magnetic field 90 to generate a first detection signal SJ1 and a second detection signal SJ2. In this embodiment, the first detection device 1101 and the second detection device 1102 are induction coils specifically. Of course, there can be more than two detection devices on the automatic moving device 10, and the more than two detection devices sense the change of the magnetic field 90 to generate more than two detection signals respectively.

In order to better sense the change of the electromagnetic field 90, the induction coils are usually vertically disposed on the automatic moving device 10, such that an effective area of the electromagnetic field 90 sensed by the induction coils is maximal, and the effective area is the area vertical to a magnetic field direction. Of course, the induction coils can be disposed on the automatically moving device 10 non-vertically, for example, disposed on the automatic moving device 10 with different included angles of 75° and 45°. No matter the induction coils are disposed on the automatic moving device 10 in which angle, as long as the induction coils have the effective area, and can sense the generated detection signal.

In this embodiment, the first detection device 1101 and the second detection device 1102 are respectively located at left and right sides of the central axis Y of the automatic moving device 10 and are left and right symmetric about the central axis Y. Of course, the first detection device 1101 and the second detection device 1102 can be located on other positions of the automatic moving device 10. When the automatic moving device 10 has two charging jointing terminals, the positions of the first detection device and the second detection device 1102 are symmetric about the central axis of the two charging jointing terminals. The first detection device 1101 and the second detection device 1102 are respectively located in different sides of motor 106. For example, the first detection device 1101 is located in the left side of motor 106 and the second detection device 1102 is located in the right side of motor 106. When the automatic moving device 10 comprises more than two detection devices, one of the detection devices is located in a different side of motor 106.

When the automatic moving device 10 comprises more than two detection devices, there are many choices about the specific position of each detection apparatus on the automatic moving device 10. Specifically, when the automatic moving device 10 comprises three detection devices, two of the detection devices are respectively located at left and right sides of the central axis, and the last detection apparatus is located on certain point of the symmetric axis. Many embodiments exist about the disposing of the specific position. In the following text, the embodiment that the automatic moving device 10 has two detection devices is introduced in detail.

In order to avoid the complexity of simulating the signal treatment process, in this embodiment, the detected detection signal is subjected to analog digital conversion, and then, a digital signal processor is configured to denoise. It is known by those skilled in the art that, if the analog digital conversion is not performed, the denoising treatment process in this embodiment can also be realized using a corresponding hardware circuit.

Figure 4:
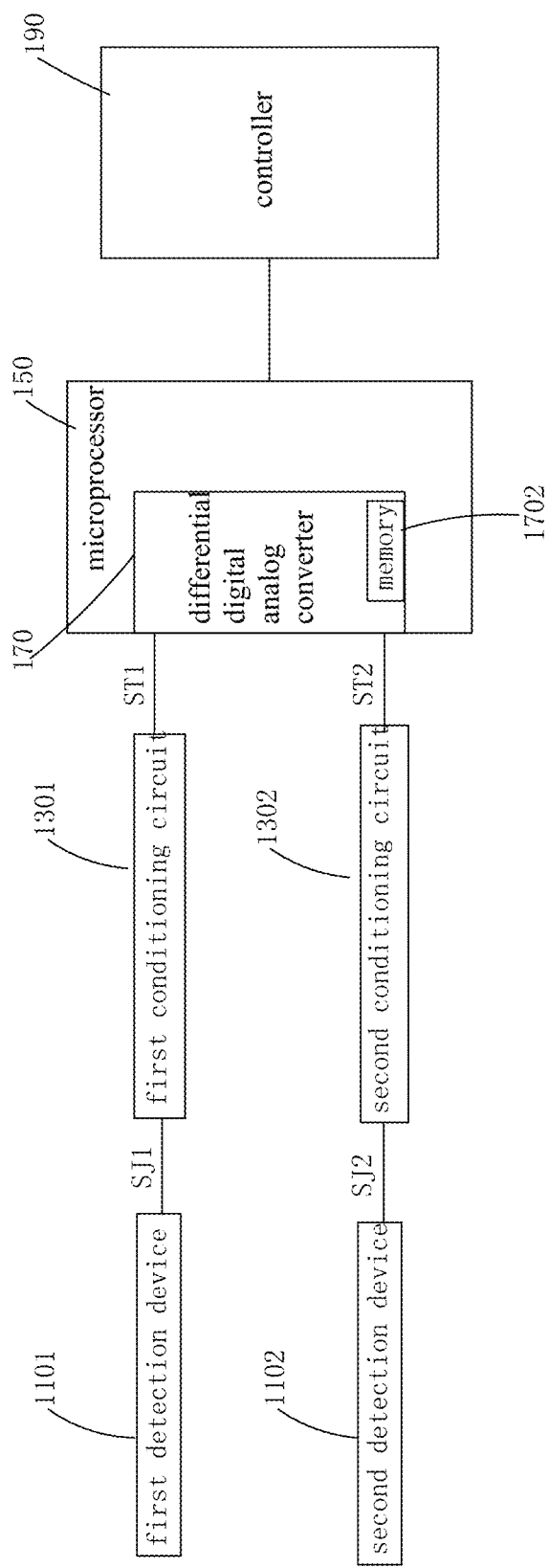
FIG. 4 is a schematic diagram of modules of an automatic moving device of a preferable embodiment of the automatic working system as shown in FIG. 2.

As shown in FIG. 4, the automatic moving device 10 further comprises a first conditioning circuit 1301 electrically connected to the first detection device 1101, a second conditioning circuit 1302 electrically connected to the second detection device 1102, a differential analog digital converter 170 electrically connected to the first conditioning circuit 1301 and the second conditioning circuit 1302 respectively, and a processor 150 electrically connected to the differential analog digital converter 170.

The first conditioning circuit 1301 amplifies the first detection signal SJ1 transmitted from the first detection device 1101 to obtain a first adjusting signal ST1, such that the first adjusting signal ST1 accords with an input demand of the differential analog digital converter 170.

The second conditioning circuit 1302 amplifies the second detection signal SJ2 transmitted from the second detection device 1102 to obtain a second adjusting signal ST2, such that the second adjusting signal ST2 accords with an input demand of the differential analog digital converter 170.

The amplifying parameters in the first conditioning circuit 1301 and the second conditioning circuit 1302 are the same, to ensure that a corresponding relationship between the obtained first conditioning signal ST1 and the second conditioning signal ST2 equals to that between the first detection signal SJ1 and the second detection signal SJ2.

In order to obtain better precision, the differential analog digital converter 170 is adopted in this embodiment to perform analog digital conversion on the first conditioning signal ST1 and the second conditioning signal ST2 respectively. It is known by those skilled in the art that two analog digital converters with the same parameters can also be adopted to perform analog digital conversion on the first conditioning signal ST1 and the second conditioning signal ST2 respectively. In this embodiment, a selected sampling frequency of the analog digital conversion is 50 KHz. It is known by those skilled in the art that the sampling frequency can also adopt other numbers, and the sampling frequency does not limit the present invention.

After treated by the differential analog digital converter 170, the first conditioning signal ST1 and the second conditioning signal ST2 are converted into a first digital signal SD1 and a second digital signal SD2 respectively. The differential analog digital converter 170 transmits the first digital signal SD1 and the second digital signal SD2 to the processor 150 for denoising treatment. In this embodiment, the differential analog digital converter 170 also contains a memory 1702 for storing the first digital signal SD1 and/or the second digital signal SD2. It is known by those skilled in the art that a microprocessor containing a memory space instead of the differential analog digital converter containing the memory may also be adopted, and only the first digital signal SD1 and/or the second digital signal SD2 are stored in the microprocessor.

After the processor 150 receives the first digital signal SD1 and the second digital signal SD2, the received digital signal is treated according to a built-in denoising control algorithm, and a treated result is transmitted to the controller 190. The treated result comprises that whether the first detection device 1101 detects an effective signal, whether the second detection device 1102 detects an effective signal, whether the first detection device 1101 is located in a working region 30, and whether the second detection device is located in the working detection region 30.

The controller 190 sends a corresponding control command to the automatic working device based on the treated result. For example, when both the first detection device 1101 and the second detection device 1102 do not detect the effective signal, the controller 190 does not send any action command, such that the automatic moving device 10 does not move any more; when the first detection device 1101 is in the working region 30 and the second detection device 1102 is in the non-working region 70, if the automatic working device is in a working mode, then the controller 190 sends a command of turning leftwards and advancing, and if the automatic working device is in a returning mode, then the controller 190 sends a command of continue to advance along the original direction. A user or designer can design the specific control command by self according to different treated results. Therefore, logic therein is not repeated any more.

The denoising control algorithm executed by the processor 150 and the controller 190 is specifically introduced as follows:

Since in the actual scene, an interference signal (i.e., the noise in the text) is random, and has uncertainty, when the denoising control algorithm is introduced in the text, the specific process of the algorithm is specified by merely adopting an assumed ideal signal. The illustrated signal waveform is not a signal obtained in an actual scene, and the illustrated waveform content does not limit the present invention. The drawings only show a signal waveform in one processing period.

Since the denoising control algorithm flows of the first digital signal SD1 and the second digital signal SD2 are similar, in the text, only the treatment process of the first digital signal SD1 is described by examples, i.e., only the effectiveness of the first detection signal SJ1 and the fact whether the first detection device 1101 is in or outside the working region 30 are judged.

Figure 5:
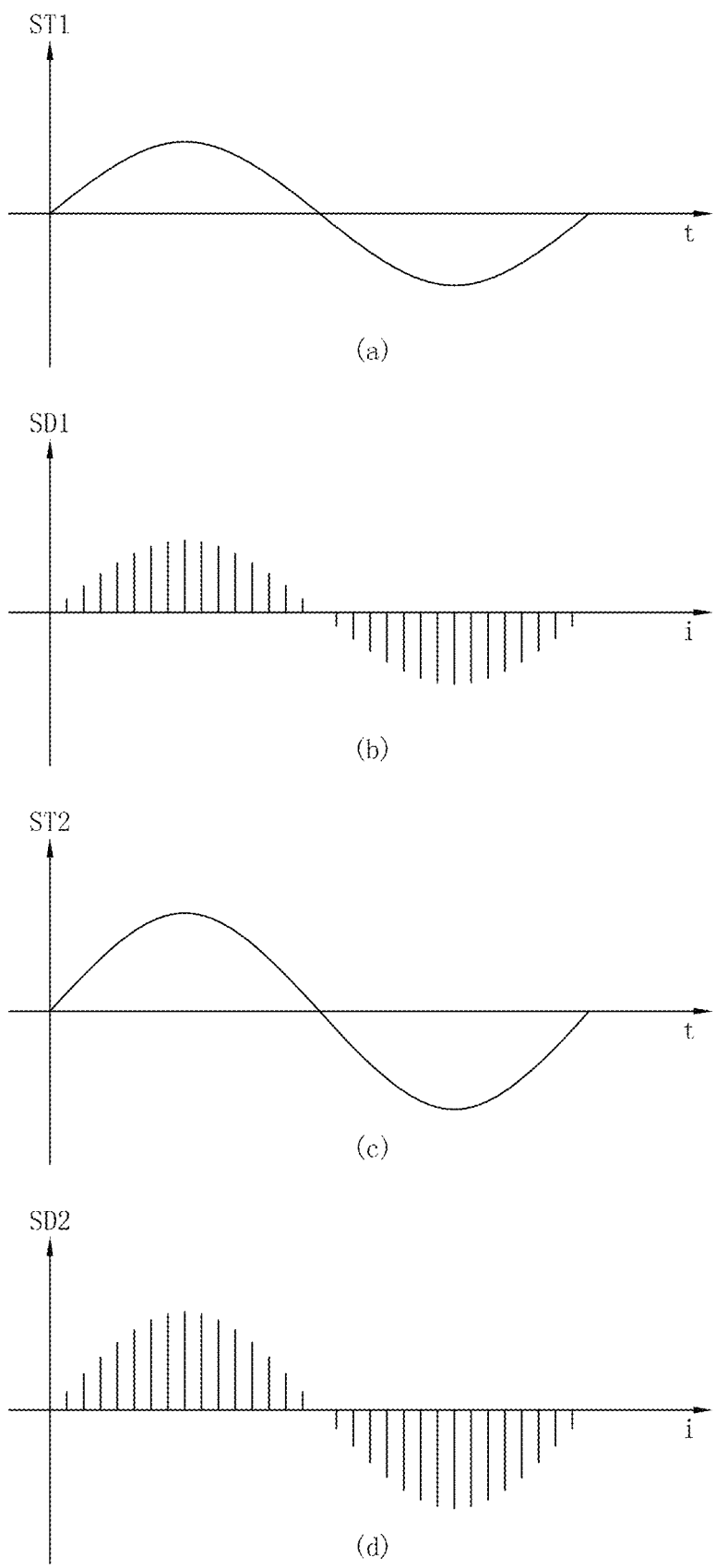
FIG. 5 is a schematic diagram of a signal waveform in an analog digital conversion process.

The first conditioning signal ST1 output from the first conditioning circuit 1301 is as shown in FIG. 5(*a*), and is changed into the first digital signal SD1 as shown in FIG. 5(*b*) after sampled by the differential analog digital converter 170. As shown in FIGS. 5(*a*) and 5(*b*), the first digital signal SD1 maintains the physical characteristics of the first conditioning signal ST1, such as signal period, signal amplitude value, signal phase, etc. In the conversion process, the time characteristic t of the first conditioning signal ST1 correspondingly becomes an index characteristic i of the first digital signal SD1.

Similarly, the second conditioning signal ST2 output from the second conditioning circuit 1302 is as shown in FIG. 5(c), and is changed into the second digital signal SD2 as shown in FIG. 5(d) after sampled by the differential analog digital converter 170. As shown in FIGS. 5(c) and 5(d), the second digital signal SD2 maintains the physical characteristics of the second conditioning signal ST2, such as signal period, signal amplitude value, signal phase, etc. In the conversion process, the time characteristic t of the second conditioning signal ST2 correspondingly becomes an index characteristic i of the second digital signal SD2.

Figure 6:
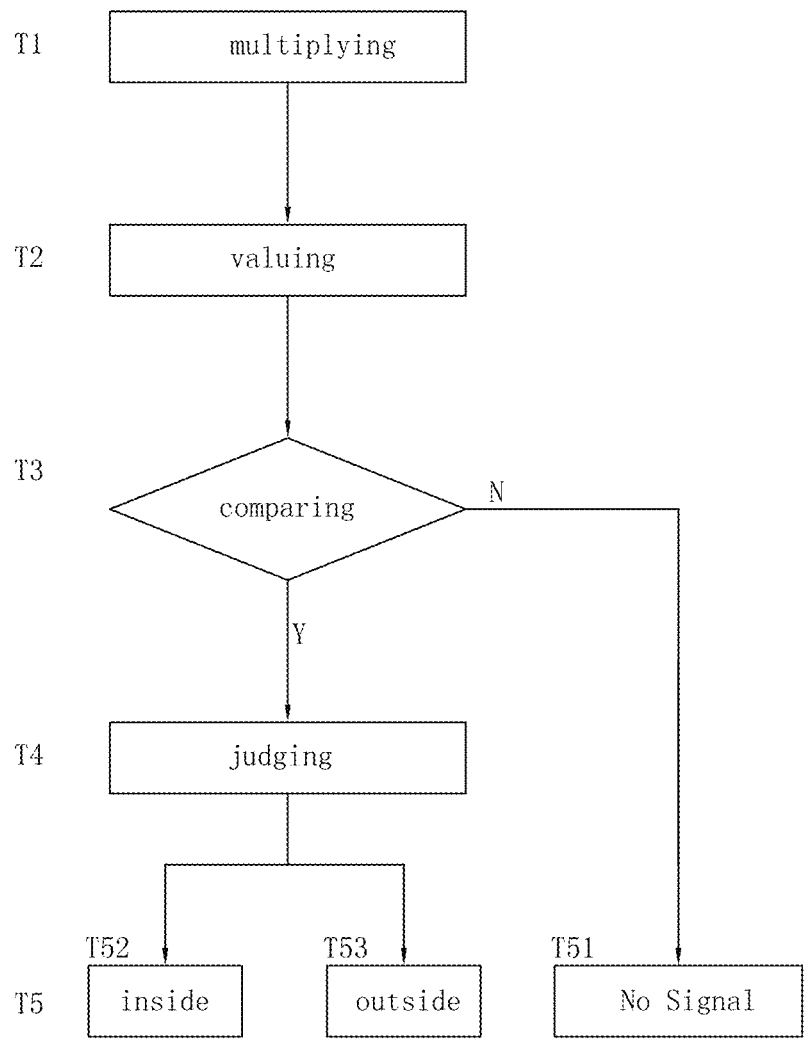
FIG. 6 is a step block diagram of a denoising algorithm of a preferable embodiment of the present application.

Steps of the specific denoising control algorithm are as shown in FIG. 6:

Step T1, multiplying: multiplying the obtained digital signal to obtain a product signal SM. In this step, the direction of the product signal is kept the same as the direction of the first digital signal SD1. Specific details in the step will be described later.

Step T2, valuing: valuing the product signal SM. In this step, a first signal point S_point 1 and a second signal point S_point 2 are determined by the product signal SM. Characteristic values are generated based on the parameters of the first signal point S_point 1 and the second signal point S_point 2, the characteristic values are compared with preset thresholds, and whether the first detection signal is interfered by noise is judged according to a judging result. Specific details in the step will be described later.

Step T3, comparing: comparing the characteristic values obtained in step T2 with the preset thresholds in the automatic moving device 10, thereby judging whether the first detection signal SJ1 is interfered by noise, i.e., whether the first detection signal is an effective signal. Specific details in the step will be described later. If the signal is judged to be the effective signal, step T4 is performed; if the signal is judged not to be the effective signal, step T5 is performed.

Step T4, judging: continuing to judge whether the first detection device 1101 is in or outside the working region 30.

Step T5, transmitting different results to the controller 80 according to the judging conditions of step T3 and step T4.

Before step T1 is performed, an amplifying step may be increased, i.e., the first digital signal SD1 and the second digital signal SD2 are amplified.

Generation and change characteristics of the electromagnetic field 90 may be different due to different current signals SS. The flow of the denoising algorithm in this embodiment is not affected by the change of specific current signals SS. Referring to FIG. 5, the signal detection apparatus detects the electromagnetic field 90 ceaselessly to generate a corresponding detection signal. Therefore, seen from the time axis, the detection signals, the conditioning signals and the digital signals are continuously updated and changed. The memory 1702 of the differential analog digital converter 170 takes the signals stored in a time period as data in the denoising control algorithm. In actual working scene, the sampling frequency of the differential analog digital converter 170 is 50 KHz, i.e., the first conditioning signal ST1 is sampled once every 20 us to obtain a corresponding digital amplitude value. According to the capacity of the memory 1702, 700 value points can be stored every time, and the corresponding time is 14 ms. Therefore, in this embodiment, the processing period of the denoising control algorithm is 14 ms, i.e., the corresponding index period of the digital signals is 700 points. It is known by those skilled in the art that the processing period can be changed according to selected hardware or adding a limiting condition. Therefore, the processing period does not constitute a limitation to the present invention.

As earlier mentioned in the text, the time characteristic t of the analog signals and the index characteristic i of the digital signals have a one to one corresponding relationship. In the actual working scene, the corresponding relationship between the time characteristic t and the index characteristic is as shown in the following table:

Table 1 corresponding relationship between time characteristic t and index characteristic i

| t/us | 0 | 20 | 40 | 60 | 80 | 100 | 120 | ... | 139960 | 13980 | 14000 |
|---|---|---|---|---|---|---|---|---|---|---|---|
| i/Index | 0 | 1 | 2 | 3 | 4 | 5 | 6 | ... | 698 | 699 | 700 |

Figure 7:
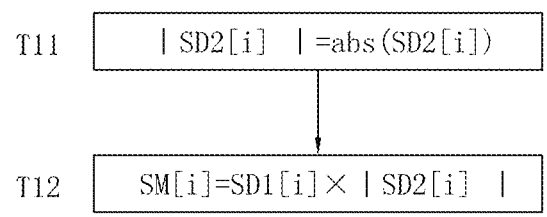
FIG. 7 is a flow chart of a specific product of step T1 in the step block diagram as shown in FIG. 6.
Figure 8:
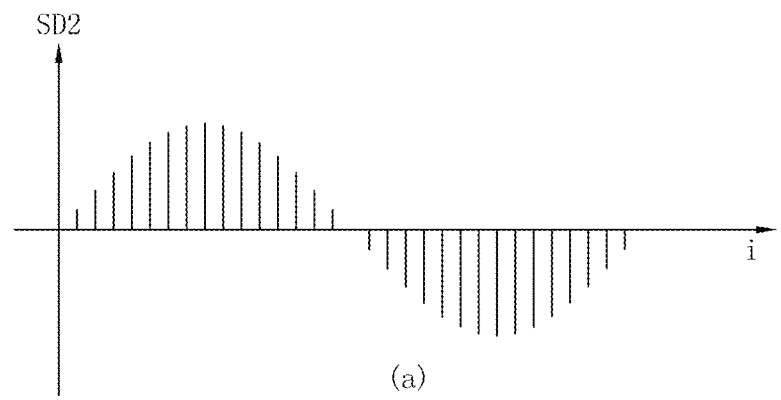
FIG. 8 is a schematic diagram of a signal waveform of a treatment process according to the steps of FIG. 7 of a preferable embodiment of the present application.
Figure 8:
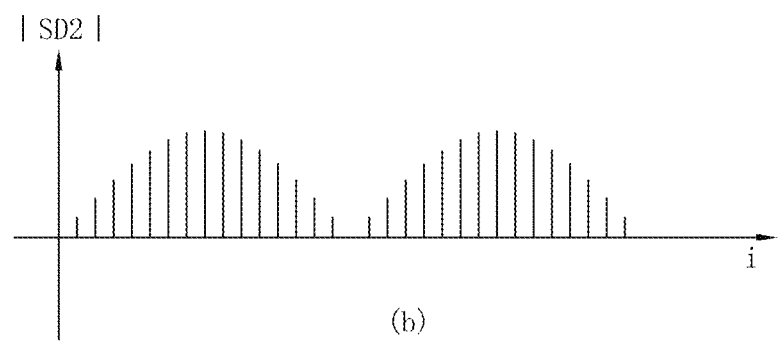
Figure 8:
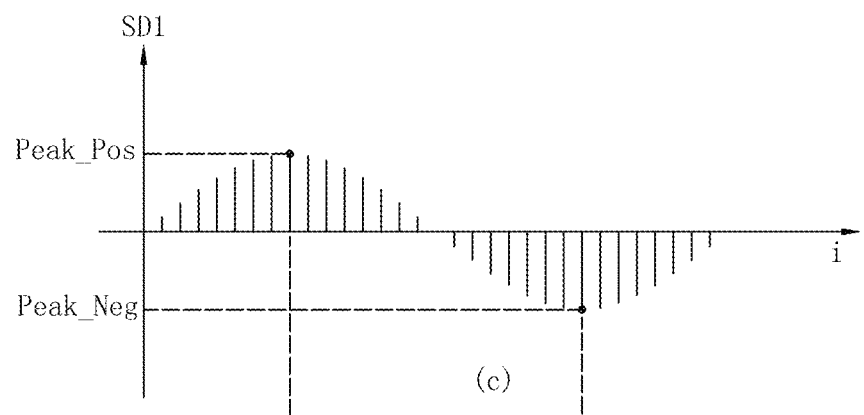
Figure 8:
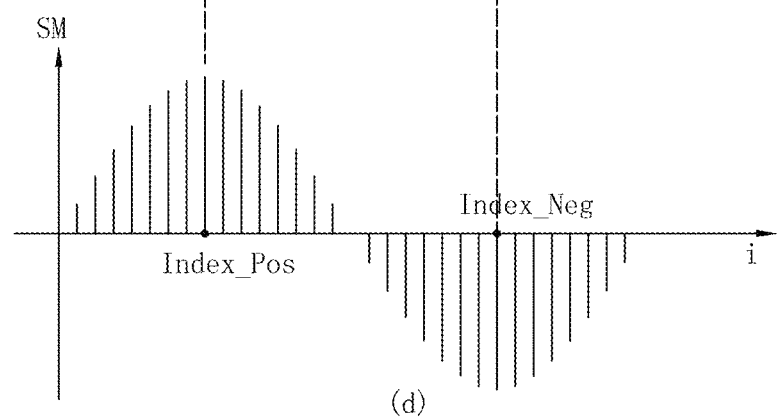

As shown in FIG. 7, the signal multiplying step T1 also comprises the following two steps:

Step T11: in the processing period, solving the absolute value of each point of the second digital signal SD2, i.e., |SD2[i]|=abs(SD2[i]). A specific schematic process is as shown in FIG. 8. FIG. 8(a) is a waveform schematic diagram of the second digital signal SD2, and FIG. 8(b) is a waveform schematic diagram of the second digital signal SD2 subjected to absolute value solving.

Step T12: in the processing period, multiplying each point of the first digital signal SD1 by the absolute value |SD2| of the second digital value corresponding to the point to obtain the product signal SM, i.e., SM[i]=SD1[i]×|SD2[i]|. The specific schematic process is as shown in FIG. 8, the absolute value |SD2| of the second digital value in FIG. 8(b) and the first digital signal SD1 are multiplied on the corresponding index point to obtain the product signal SM as shown in FIG. 8(d). As shown in FIG. 8(d), the direction of the product signal SM obtained by the multiplying operation is same as that of the first digital signal. The amplitude value of the SM is obtained by multiplying amplitude value absolute value of the second digital signal SD2 by the amplitude value of the first digital signal. Therefore, the product signal SM contains the phase information of the first digital signal, and also contains the amplitude value information of the first digital signal SD1 and the second digital signal SD2.

In this embodiment, the manner of solving the absolute value of the second digital signal SD2 is adopted, such that the direction of the product signal SM is kept the same as that of the first digital signal SD1. Of course, those skilled in the art can also adopt other manners to achieve the aim.

After the product signal is obtained, some features of the product signal are corresponded to the detection signal to obtain a judgment value for judging together with the preset thresholds. In this embodiment, the digital signals are obtained by conditioning and sampling the detection signals, and the features of the digital signals correspond to those of the detection signals. Therefore, in this embodiment, the next step is to correspond some features of the product signal to the digital signals to obtain a judging value for comparing with the preset thresholds.

Figure 9:
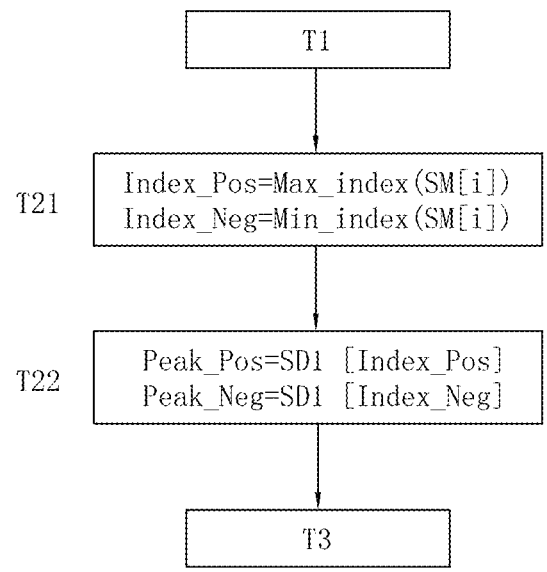
FIG. 9 is a specific corresponding flow chart of step T2 in the step block diagram as shown in FIG. 6.

As shown in FIG. 9, the corresponding valuing step T2 also comprises the following two steps:

Step T21: in the processing period, solving the index at the maximal value of the product signal SM to obtain a large value index Index_Pos, i.e., Index_Pos=Max_index(SM[i]); in the processing period, solving the index at the minimal value of the product signal SM to obtain a small value index Index_Neg, i.e., Index_Neg=Min_index(SM[i]).

In this embodiment, the large value index Index_Pos and the small value index Index_Neg are obtained by solving the indexes of the product signal SM at the maximal value and the minimal value. The large value index Index_Pos can be the index of certain point in a preset range at the maximal value of the product signal SM, for example, the amplitude value at the maximal value of the product signal SM is A, then the large value index Index_Pos can be the index corresponding to the certain signal point in the range with the amplitude equal to 0.9A–A. Similarly, the small value index Index_Neg can be the index of certain point in the preset range at the minimal value of the product signal SM.

Step T22: in the processing period, the point at the large value index Index_Pos corresponding to the first digital signal SD1 is the first signal point S_point1, and the point at the small value index Index_Neg corresponding to the first digital signal SD1 is the second signal point S_point2. The amplitude value of the first signal point S_Point1 is solved to obtain a peak value Peak_Pos, i.e., Peak_Pos=SD1(Index_Pos); the amplitude value of the second signal point S_Point2 is solved to obtain a valley value Peak_Neg, i.e., Peak_Neg=SD1(Index_Neg).

As shown above, in the corresponding valuing step T2, the control algorithm obtains four characteristic values for judging, namely, the large value index Index_Pos, the small value index Index_Neg, the peak value Peak–Pos and valley value Peak_Neg.

Figure 10:
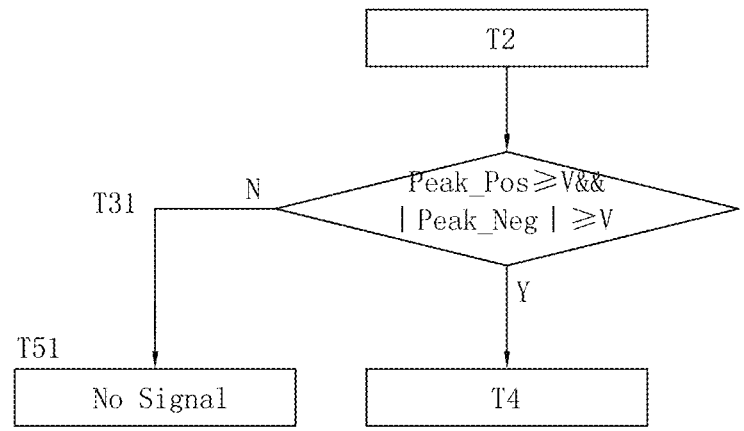
FIG. 10 is a flow chart of a first embodiment of specifically judging an effective signal of step T3 in the step block diagram as shown in FIG. 6.

After the control algorithm obtains the judgment value, step T3 of judging whether the signal is effective is performed. FIG. 10 discloses a first embodiment of step T3.

Step T31: comparing the peak value Peak_Pos with the preset threshold V; solving the absolute value of the valley value Peak_Neg, and comparing the absolute value with the preset threshold value V; if the two comparison results are both larger than or equal to the threshold value V, i.e., Peak_Pos≥V&&|Peak_Neg|≥V, performing step T4; otherwise, judging the first digital signal SD1 to be an ineffective signal, directly performing step T51, the conclusion output to the controller 190 being no signal.

The threshold value V is a variable, and its specific value may be different in different processing periods. The processor 150 determines the specific value of the threshold value V according to the peak values of all signals in step T2. The threshold value V has a lower limit value V0, i.e., V≥V0. The lower limit value is determined by experiment, and its specific value is related to the automatic working system. In the automatic working system, the point farthest away from the boundary wire 50 is selected, and the signal peak value measured at this point is the lower limit range value V0. The T31 judging step judges whether the detected signal is an effective signal from the aspect of amplitude value of the signal, thereby removing the interference noise.

Figure 11:
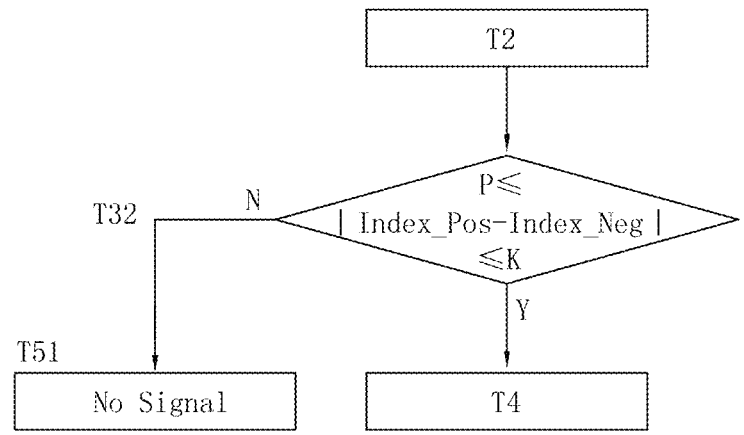
FIG. 11 is a flow chart of a second embodiment of specifically judging an effective signal of step T3 in the step block diagram as shown in FIG. 6.

FIG. 11 discloses a second embodiment of step T3.

Step T32, performing method of difference on the large value index Index_Pos and the small value index Index_Neg, solving the absolute value of the difference value, and comparing the absolute value with a preset interval value; if the absolute value is in the interval [P, K], i.e., P≤|Index_Pos–Index_Neg|≤K, then performing step T4; otherwise, judging the first digital signal to be an ineffective signal, directly performing step T51, the conclusion output to the controller 190 being ineffective signal.

The interval lower limit value P and the interval upper limit value K are related to the automatic working system. According to the boundary signal SS generated by the signal generating apparatus 80, it can be theoretically calculated that in the case of no noise interference, in any processing period, the changed time node of the rising edge of the detection signal of the detection apparatus is the index point, the index point is defined as P; and the changed time node of the rising edge of the detection signal is the index point, and the index point is defined as K.

T32 determines whether the detected signals are effective signals from the aspect of signal period, thereby removing the interference noise.

Figure 12:
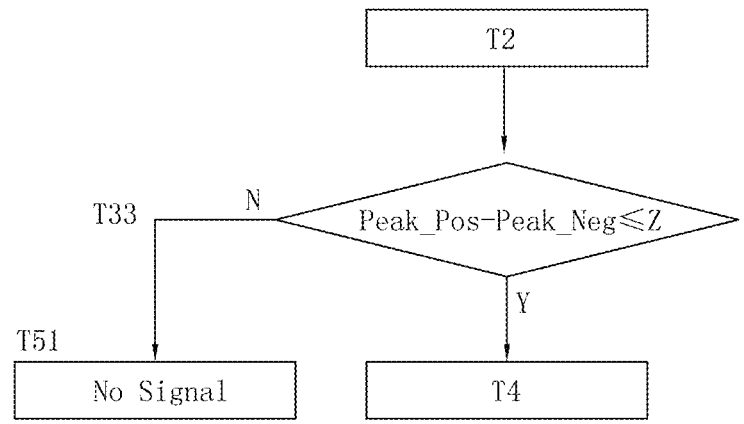
FIG. 12 is a flow chart of a third embodiment of specifically judging an effective signal of step T3 in the step block diagram as shown in FIG. 6.

FIG. 12 discloses a third embodiment of step T3.

Step T33: after the method of difference is performed on the peak value Peak_Pos and the valley value Peak_Neg, and comparing the difference value with the preset amplitude value Z; entering step T4 if the difference value is smaller than or equal to the amplitude value, i.e., Peak_Pos–Peak_Neg≤Z, otherwise, judging the first digital signal SD1 to be an ineffective signal, directly entering step T51, the conclusion output to the controller 190 being no signal.

The amplitude value Z is a signal amplitude value span set according to the automatic working system. In the case of no noise interference, the amplitude value space of the signal detected by the detection apparatus does not exceed the amplitude value Z.

T33 judging step determines whether the detected signal is an effective signal from the aspect of signal amplitude value, thereby preventing the controller from making an inappropriate control command according to the signal interfered by the noise.

Figure 13:
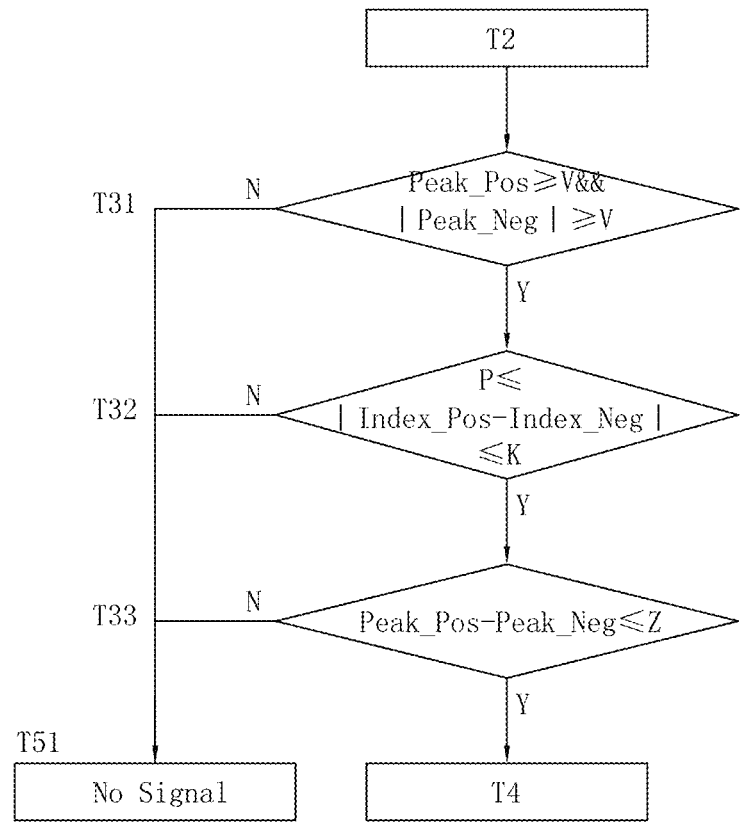
FIG. 13 is a flow chart of a fourth embodiment of specifically judging an effective signal of step T3 in the step block diagram as shown in FIG. 6.
Figure 14:
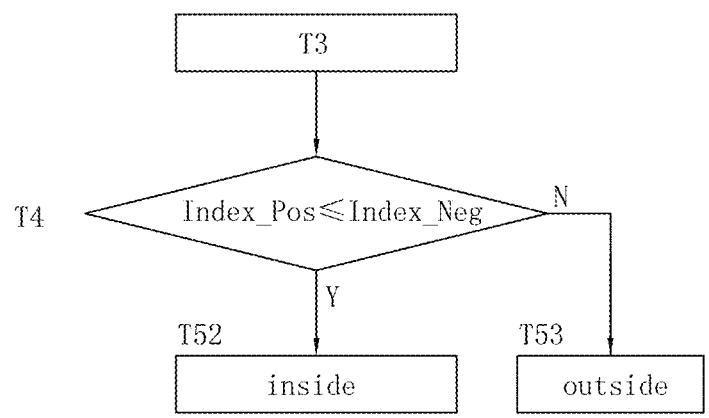
FIG. 14 is a flow chart of specifically judging inside and outside of step T4 in the step block diagram of FIG. 6.

FIG. 13 discloses a fourth embodiment of step T3, the fourth embodiment comprises the above 3 judging steps, and the specific step flow is as follows:

Step T31: comparing the peak value Peak_Pos with the preset threshold V; after solving the absolute value of the valley value Peak_Neg, comparing the absolute value with the preset threshold V; if the two comparison results are both larger than or equal to the threshold V, i.e., Peak_Pos≥V&&|Peak_Neg|≥V, then performing step T32; otherwise, judging that the first digital signal SD1 is an ineffective signal, directly entering step T51, the conclusion output to the controller 190 being no signal.

Step T32: performing the method of difference on the large index Index_Pos and the small value Index_Neg, solving the absolute value of the difference value, and comparing the absolute value with a preset interval value; if the absolute value is in the interval [P,K], i.e., P≤|Index_Pos–Index_Neg|≤K, entering step T33; otherwise, judging that the first digital signal is an ineffective signal, directly entering step T51, the conclusion output to the controller 190 being ineffective signal.

Step T33: after the peak value Peak_Pos and the valley value Peak_Neg are subjected to the method of difference, comparing the difference value with the preset amplitude value Z; if the difference value is smaller than or equal to the amplitude value, i.e., Peak_Pos–Peak_Neg≤Z, entering step T4; otherwise, judging the first digital signal SD1 to be an ineffective signal, directly entering step T51, the conclusion output to the controller 190 being no signal.

Step T33 and T31 both denoise from the aspect of signal amplitude values, step T33 further confirms step T31, and step T32 denoises from the aspect of signal period, thereby improving the accuracy of judging whether the signal is effective. When the judgment result of step T3 is that the first digital signal SD1 is the effective signal, step T4 of judging inside and outside is performed. A specific process of Step T4 is as shown in FIG. 11.

Step T4: comparing the large value index Index_Pos and the small value index Index_Neg; if the large value index Index_Pos is smaller than the small value index Index_Neg, judging that the first detection device 1101 configured to obtain the first digital signal SD1 is in the working region 30, entering step T52, a conclusion output to the controller 190 being that the first detection device is in the working region; otherwise, judging the first detection device 1101 configured to obtain the first digital signal SD1 is outside the working region 30, entering step T53, a conclusion output to the controller 190 being that the first detection device is outside the working region.

In the automatic working system, according to the boundary signal SS generated by the signal generating apparatus 80, it can be theoretically calculated that in the case of no noise interference, in any processing period, the signal detection apparatus in the working region 30 firstly detects the peak value then detects the valley value, and the signal detection apparatus in the non-working region 70 firstly detects the valley value and then detects the peak value. Therefore, whether the detection apparatus of the detection signal is in or outside the working region can be detected by judging an occurrence sequence of the signal peak value and the valley value, thereby judging whether the automatic moving device is in or outside the working region.

Figure 15:
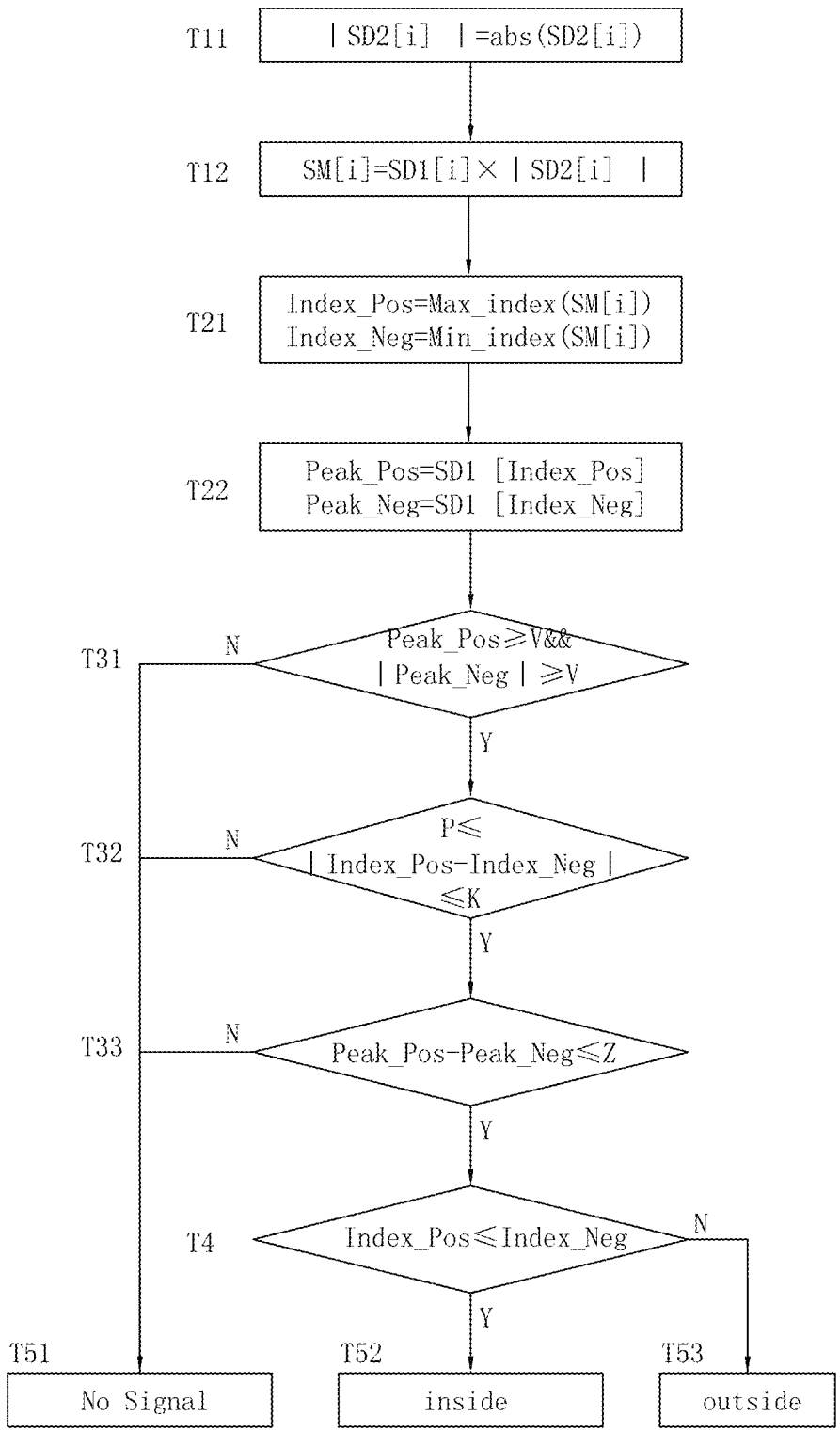
FIG. 15 is a corresponding specific flow chart of the step block diagram as shown in FIG. 6.

The whole flow of the control algorithm is as shown in FIG. 15. FIG. 15 is a complete flow chart integrating step T1, step T2, step T3, step T4 and step T5 together.

In this embodiment, the first signal point S_Point1 and the second signal point S_Point2 are solved from the first digital signal SD1. In another embodiment, the first signal point S_Point1 and the second signal point S_Point2 can be solved from the second digital signal SD2. Specifically, the point of the second digital signal SD2 at the large value index Index_Pos is the first signal point S_Point1, and the point of the second digital signal SD2 at the small value index Index_Neg is the second signal point S_Point2. In another embodiment, the first signal point S_Point1 and the second signal point S_Point2 can be solved from the product signal SM. Specificallythe point of the product signal SM at the large value index Index_Pos is the first signal point S_Point1, and the point of the product signal SM at the small value index Index_Neg is the first signal point S_Point2.

When the first signal point S_Point1 and the second signal point S_Point2 are valued from different signals, the flow of the denoising control algorithm of the present invention is not affected. When the first signal point S_Point1 and the second signal point S_Point2 valued from different signals, the specific values of the characteristic values generated based on the parameters of the first signal point S_Point1 and the second signal point S_Point2 may be changed, therefore, only the range of values of the preset thresholds needs to be adaptively changed.

Not only is the effective signal obtained from the denoising control algorithm configured to judge whether the automatic moving device is in or outside the working region, but also the strength of the effective signal (i.e., the amplitude value of the waveform signal) can be configured to judge the distance between the automatic moving device and the boundary wire. Further, by the distance between the automatic moving device and the boundary wire, a working path of the automatic moving device or the route of returning to charging station can be defined, thereby avoiding damage to a lawn. After subjected to the denoising control algorithm, the anti-interference capacity of the automatic working system can be effectively improved. Therefore, the automatic working system not only is suitable for a small-range working region, but also can be applicable to a large-range working region (for example, the area of the working region 30 is larger than 2800 square meters).

The above embodiments are a control process of judging whether the first detection device 1101 is in the working region. It is known by those skilled in the art that the control process of judging whether the second detection device 1102 is in the working region is similar with the above process, as long as the absolute value solving step in step T2 is changed to solve the absolute value of the first digital signal SD1, in the valuing process of the subsequent step T3, the corresponding value of the second digital signal SD2 is solved, and the control step is not repeated in the text.

Figure 16:
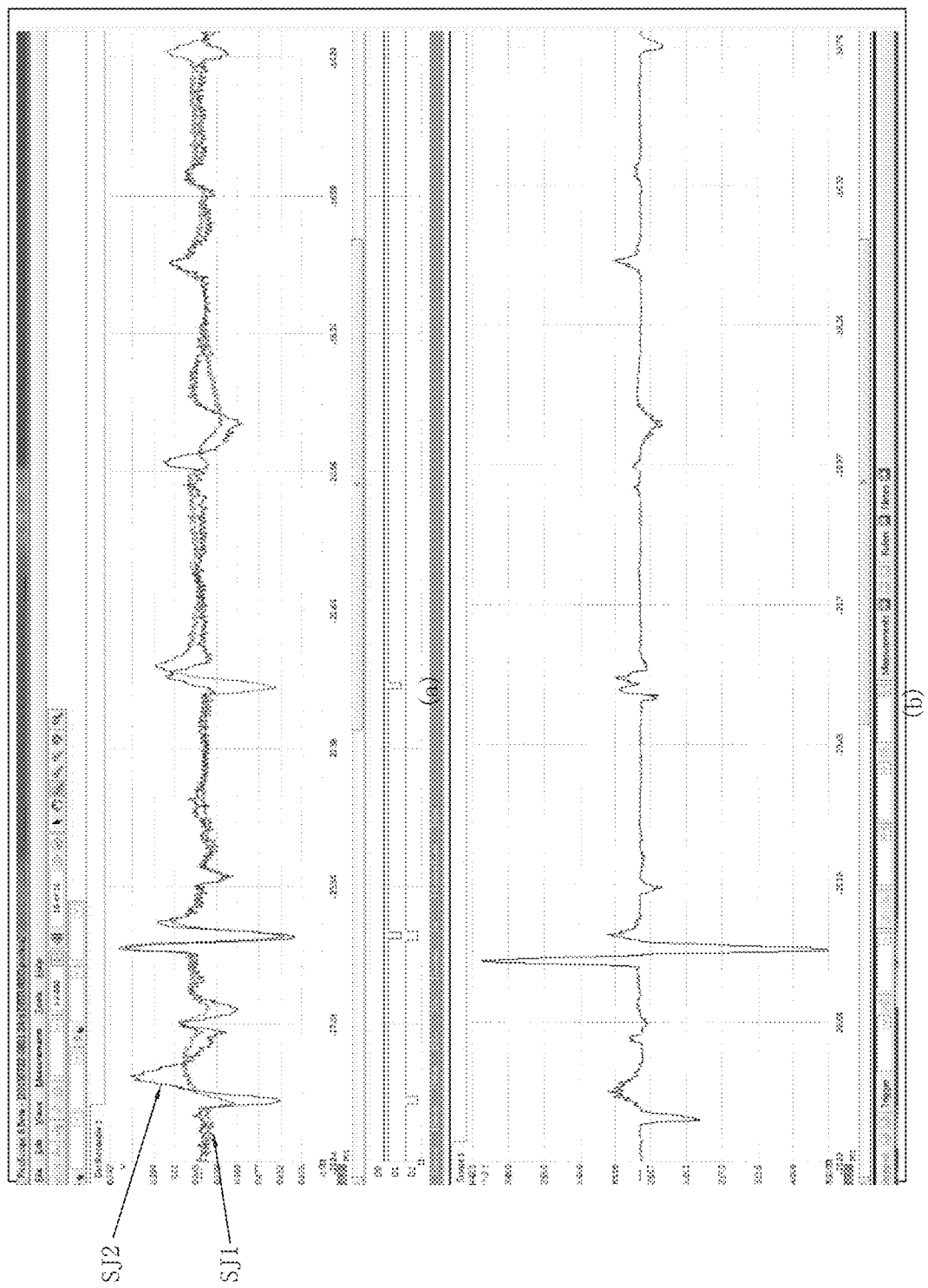
FIG. 16 is a schematic diagram of a detection signal waveform in an actual working scene and a schematic diagram of a waveform subjected to a multiplying step of a preferable embodiment of the present application.

In the process of explaining the above denoising control process, the specific process of the algorithm is described by adopting an assumed ideal signal. The actual signal waveform drawing of the automatic working system of this embodiment, detected in an actual working scene is as shown in FIG. 16($a$), the red waveform is a first detection signal SJ1 detected by the first detection device 1101, the blue waveform is a second detection signal SJ2 detected by the second detection device 1102, and the actually detected signals contain many points with great noise influence. In related simulation software (Matlab), the actual signal is directly subjected to step T1 operation to obtain the actual waveform of the product signal SM as shown in FIG. 16($b$). After subjected to the multiplying processing step, the large value index Index_Pos corresponding to the product signal SM and the small value index Index_Neg are just points with small influence in the actually detected signals. By the simulation operation on the actually detected signals, those skilled in the art can easily obtain that the control algorithm mentioned in the text has very strong inhibiting effect on the interference caused by noise, such that the case that the controller sends a wrong control command due to interference is greatly reduced.

Figure 17:
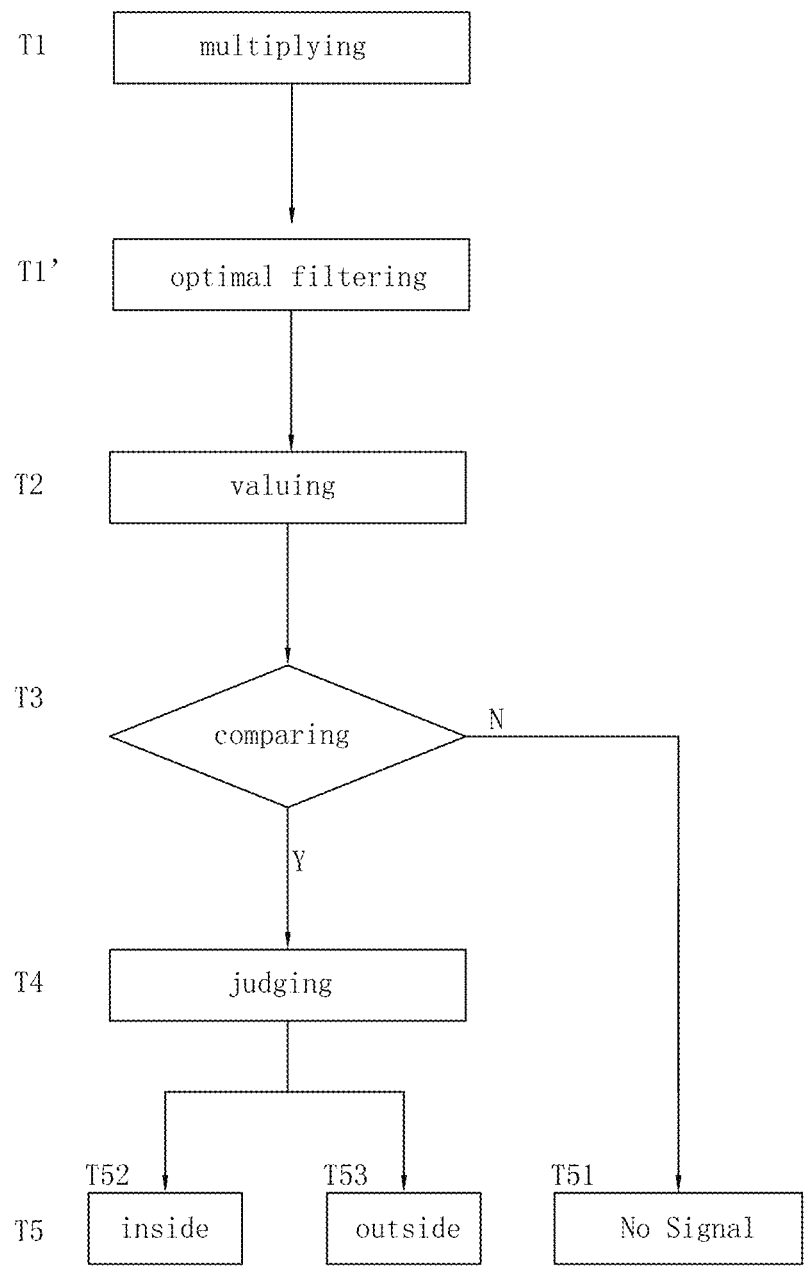
FIG. 17 is a step block diagram of a denoising algorithm of another preferable embodiment of the present application.

In the embodiment of more than two detected signals, the process steps is similar to the embodiment of two detected signals. The specific different step is: in the multiplying step, multiplying the plural detection signals each other to generate a product signal FIG. 17 shows a step block diagram of another preferable embodiment of the present application. The specific steps of this embodiment are more than the embodiment as shown in FIG. 6 by an optimal filtering step T1', a signal to noise ratio of the signal is maximized and the anti-interference capacity of the automatic working system is further improved. The optimal filtering step T1' is set to be between step T1 of performing the multiplying step on the obtained digital signals to obtain a product signal SM and step T2 of correspondingly valuing by the product signal SM. In the optimal filtering step T1', the product signal obtained in step T1 is subjected to optimal filtering, and the product signal subjected to optimal filtering serves as an input signal of step T2.

In the embodiment, an optimal filter is disposed in the processor 150, the optimal filter has an optimal filtering core h, and the optimal filtering core h is a basic signal of noise filtering. A specific algorithm formula of the optimal filter is as shown in the following formula: $y[n]=\Sigma_{k=-\infty}^{+\infty}h[n-k]x[k]$, characterized in that, h is the preset optimal filtering core of the optimal filter, x is an input signal of the optimal filter, and y is an output signal of the optimal filter. In this embodiment, in combination with a specific denoising environment, the optimal filtering core h is selected from the signal of the automatic moving device 10 at the preset position point of sensed boundary signals in the automatic working system. Specifically, in the automatic working system, the point farthest away from the boundary wire 50 is selected, and the signal value measured by the detection apparatus at such point is the optimal filtering core h. Of course, the optimal filtering core h can also adopt a mean value of signals measured by multiple detection devices at the weakest position point. Preferably, the optimal filtering core h can also adopt a composite signal, and the optimal filtering core h:

$$h = \frac{1}{\sqrt{S^H R_v^{-1} S}} R_v^{-1} S$$

is calculated according to a specific scene of the automatic working system, S is an ideal signal, and R is a covariance of pre-estimated noise. The boundary signal of the automatic working system is determined, and the ideal signal S can be calculated according to the boundary signal. The covariance can be pre-estimated according to the specific scene of the automatic working system.

Figure 18:
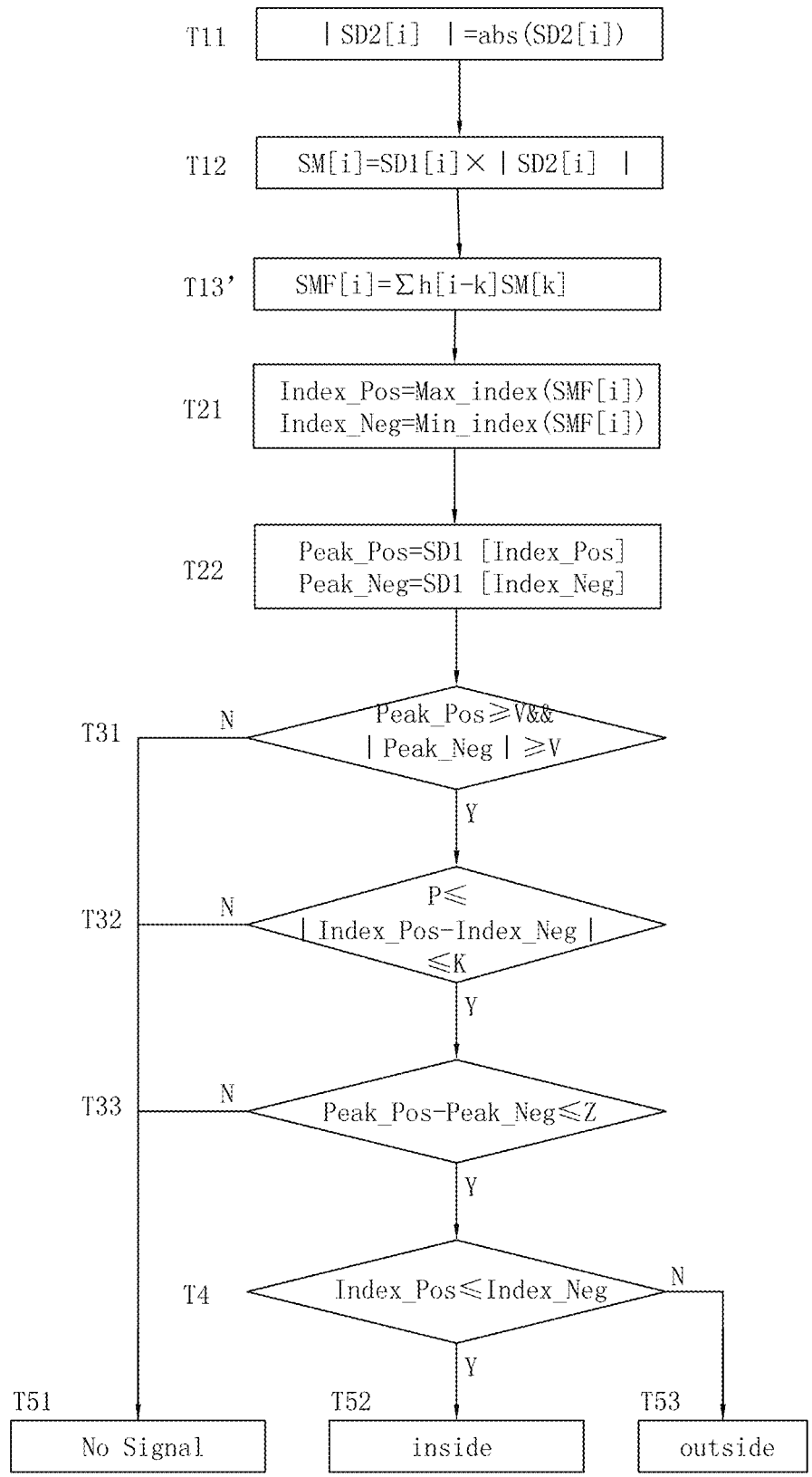
FIG. 18 is a corresponding specific flow chart of the step block diagram as shown in FIG. 17.

FIG. 18 is a specific flow chart of the embodiment as shown in FIG. 17, the embodiment is only added with the optimal filtering step compared with the denoising algorithm flow as shown in FIG. 15. The specific flow of FIG. 18 is described in the following text, and the part same as the denoising algorithm of FIG. 15 is not repeated.

Step T11: in the processing period, solving the absolute value of each point of the second digital signal SD2, i.e., |SD2[$i$]|=abs(SD2[$i$]).

Step T12: in the processing period, multiplying each point of the first digital signal SD1 by the absolute value |SD2| of the second digital signal corresponding to this point to obtain a product signal SM, i.e. SM[i]=SD1[$i$]×SD2[$i$]|.

Step T13': in the processing period, adopting the filtering core h to perform optimal filtering on the input product signal SM to obtain a filtered product signal SMF, i.e., SMF[i]=$\Sigma_{k=-\infty}^{+\infty}$h[i−k]SM[k]

Step T21: in the processing period, solving the index of the filtered product signal SMF at the maximal value to obtain a large value index Index_Pos, i.e., Index_Pos=Max_index(SMF[i]); in the processing period, solving the index of the filtered product signal SMF at the minimal value to obtain a small value index Index_Neg, i.e., Index_Neg=Min_index(SMF[i]).

The specific content of the following steps is same as the embodiment as shown in FIG. 15 and is thus not repeated. Similarly, the modifications and optimal solutions of the embodiment as shown in FIG. 15 are also suitable for the embodiment added with the filtering step as shown in FIG. 18.

Figure 19:
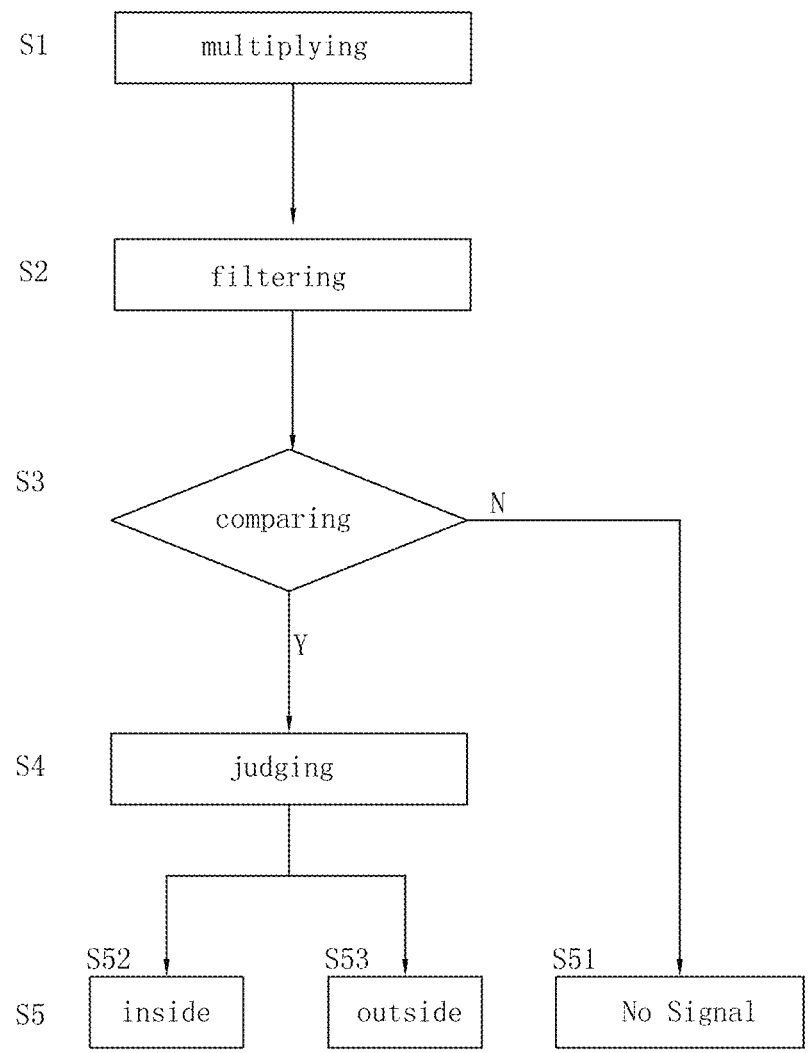
FIG. 19 is a step block chart of a denoising algorithm of another embodiment of the present application.

FIG. 19 discloses a step block chart of another embodiment of the present application. The embodiment differs from the embodiment in FIG. 6 in the judging step after the multiplying step. The embodiment as shown in FIG. 6 obtains characteristic values by the correspondingly valuing step after the signal multiplying step, then compares the characteristic values with preset thresholds, thereby judging whether the first detection signal or the second detection signal is interfered, i.e., judging whether the first detection signal or the second detection signal is an effective signal, and whether the inside outside relation between the automatic moving device and the boundary wire can be further judged based on the signal. The embodiment as shown in FIG. 19 firstly multiplies the first detection signal by the second detection signal to obtain a product signal, then filters the signals smaller than a specific intensity value, and finally judges whether the signal is effective according to a filtering result.

The anti-interference steps of the embodiment are explained in detail in the following text:

S1: multiplying the first detection signal and the second detection signal detected by the detection devices to obtain a product signal. By the multiplying step, a synchronous signal between the first detection signal and the second detection signal is effectively amplified by the product signal, and an asynchronous signal between the first detection signal and the second detection signal is effectively inhibited, S2: performing the filtering step smaller than the specific intensity value on the product signal to obtain a filtered signal. The specific intensity value is set in the controller, when the intensity value in the product signal is larger than or equal to the specific intensity value, the filtered signal reserves such part of product signal; when the intensity value in the product signal is smaller than the specific intensity value, the filtered signal does not reserve such part of product signal; the specific intensity value set in the controller can be a maximal intensity value of the detection signals of the detection devices, or an intensity value in other function relations with the maximal intensity value, for example, the specific intensity value is 30% of the maximal intensity value, or 10% of the maximal intensity value, etc. In a preferable embodiment, the specific intensity value can be determined by multiplying a basic value by a plurality of amplifying times. Specifically, according to different intensity values of the detection signals of the detection devices, the specific intensity value can be multiplied by different amplifying times, such that the sensitivity of the whole working system can be subjected to self adaptive adjustment according to different positions where the automatic moving device is.

S3: according to the filtered signal in step S2, judging whether the first detection signal or the second detection signal is interfered by noise, i.e., whether the first detection signal or the second detection signal is an effective signal. A specific judging logic comprises: judging that the first detection signal or the second detection signal is not interfered by noise and to be an effective signal if the reserved part of the product signal exists in the filtered signal in a sampling period; otherwise, judging that the first detection signal or the second detection signal in the sampling period is interfered by noise and to be an ineffective signal.

S4: continuing to perform the inside and outside judgment when the filtered signal is the effective signal. In this step, the inside and outside judgment can be directly performed by positivity and negativity of the first detection signal or the second detection signal, or can also be judged by comparing thresholds of some feature points in the product signal by means of the embodiment in FIG. 6.

S5: transmitting different results to the controller 80 according to the cases judged by step S3 and step S4.

The step of specifically judging whether the detection signals are the effective signals of the embodiment as shown in FIG. 19 can be combined with the embodiment as shown in FIG. 15 and related modifications and optimal solutions to constitute new embodiments. Similarly, the step of specifically judging whether the detection signals are the effective signals of the embodiment as shown in 19 is also applicable to the embodiment added with the filtering step as shown in FIG. 18. Since present invention has explained respective single embodiments very clearly, those skilled in the art can combine the single embodiment very easily, therefore, the combination modes of respective embodiments are not repeated in the text.

In the present invention, the automatic moving device 10 can be various forms of a mower, a dust collector, an industrial robot, etc. When the automatic moving device 10 is the mower, the automatic moving device also comprises a cutting mechanism, which comprises a cutting motor and a cutting blade, and when the mower works in the working region 30 defined by the boundary wire 50, the cutting motor drives the cutting blade to rotate and mow the lawn.

The above embodiments are merely plural embodiments of the present invention, the description is relatively specific and detailed, but cannot be understood as a limitation to the scope of the present invention patent. It should be pointed out that those common skilled in the art can also make some modifications and improvements without departing from the inventive concept, and these modifications and improvements fall within the protection scope of the present invention. Therefore, the protection scope of the present invention patent should take the appended claims as a standard.

What is claimed is:

1. A control method of an automatic working system, comprising the following steps:
   providing a signal generation apparatus configured to generate a current signal, the current signal flowing by a boundary wire to generate an electromagnetic field;
   providing an automatic moving device, the automatic moving device being provided with a plurality of detection devices comprising a first induction coil located at a first position and a second induction coil located at a second position, each of the plurality of detection devices being configured to detect said electromagnetic field;
   detecting said electromagnetic field by said plurality of detection devices to generate a plurality of detection signals respectively, the plurality of detection signals comprising a first detection signal generated by the first induction coil and a second detection signal generated by the second induction coil;
   multiplying said plurality of detection signals including the first detection signal and the second detection signal to generate a product signal, the direction of said product signal being kept same as that one of said plurality of detection signals;
   determining a first signal point and a second signal point based on said product signal;
   generating characteristic values based on parameters of said first signal point and said second signal point, comparing said characteristic values with preset thresholds and obtaining a comparison result, and judging whether said one of said plurality of detection signals is interfered by noise comprising signal interference caused by an environment or a motor according to said comparison result; and
   in response to judging that said one of said plurality of detection signals is not interfered by noise:
      judging whether a corresponding one of said plurality of detection devices is inside a working region; and
      sending a control command to control the automatic working system based on the judging whether the corresponding one of said plurality of detection devices is inside the working region.

2. The control method of an automatic working system according to claim 1, wherein said plurality of detection devices comprise a first detection device and a second detection device;
   detecting said electromagnetic field by said first detection device and said second detection device to generate a first detection signal and a second detection signal respectively;
   wherein said first detection signal is said one of said plurality of detection signals.

3. The control method of an automatic working system according to claim 2, wherein said first signal point is on said first detection signal and its position is corresponding to the position of a maximal value point of said product signal; and said second signal point is on said first detection signal and its position is corresponding to the position of a minimal value point of said product signal; or said first signal point is on said second detection signal and its position is corresponding to the position of a maximal value point of said product signal; and said second signal point is on said second detection signal and its position is corresponding to the position of a minimal value point of said product signal.

4. The control method of an automatic working system according to claim 2, wherein said first signal point is a maximal value point of said product signal; and said second signal point is a minimal value point of said product signal.

5. The control method of an automatic working system according to claim 2, wherein said characteristic values comprise an amplitude value of said first signal point, and said amplitude value is defined as a peak value; said characteristic values also comprise an amplitude value of said second signal point, and said amplitude value is defined as a valley value; said preset thresholds comprise a threshold value; the absolute values of said peak value and said valley value are compared with said threshold value respectively, if said absolute values of the peak value and said valley value are both larger than said threshold value, said first detection signal is judged not to be interfered by the noise, otherwise, said first detection signal is judged to be interfered by the noise.

6. The control method of an automatic working system according to claim 2, wherein said characteristic values comprise a time difference between said first signal point and said second signal point, which is defined as a peak-valley time difference; said preset thresholds value comprises an interval lower limit value and an interval upper limit value; said peak-valley time difference is compared with said interval lower limit value and said interval upper limit value, if said peak-valley time difference is larger than or equal to said interval lower limit value and smaller than or equal to said interval upper limit value, said first detection signal is judged not to be interfered, otherwise, said first detection signal is judged to be interfered by the noise.

7. The control method of an automatic working system according to claim 6, wherein value ranges of said interval lower limit value and said interval upper limit value are based on a period of said current signal.

8. The control method of an automatic working system according to claim 2, wherein, said characteristic values comprise an amplitude value difference between said first signal point and said second signal point, which is defined as a peak-valley amplitude difference; said preset thresholds value comprises an amplitude value; said peak-valley amplitude difference is compared with said amplitude value, if said peak-valley amplitude difference is smaller than or equal to said amplitude value, said first detection signal is judged not to be interfered, otherwise, said first detection signal is judged to be interfered by the noise.

9. The control method of an automatic working system according to claim 2, wherein if said first detection signal is not interfered by the noise, then a time sequence relation between said first signal point and said second signal point is compared, then said first detection device generating said first detection signal is judged to be located in or out said working region encircled by said boundary wire.

10. The control method of an automatic working system according to claim 2, wherein the method of keeping the direction of said product signal and that of said first detection signal same comprises: solving the absolute value of said second detection signal, then multiplying said absolute value of said second detection signal by said first detection signal, to generate said product signal.

11. The control method of an automatic working system according to claim 2, wherein said first detection signal and said second detection signal are multiplied after being subjected to analog digital conversion.

12. The control method of an automatic working system according to claim 11, wherein said characteristic values comprise a position coordinate index corresponding to the maximal value of said product signal, and such index is defined as a large value index; said characteristic values also comprise a position coordinate index corresponding to the minimal value of said product signal, and such index is defined as a small value index.

13. The control method of an automatic working system according to claim 11, wherein said characteristic values also comprise an amplitude value of said first detection signal at said large value index, which is defined as a peak value; and said characteristic values also comprise an amplitude value of said first detection signal at said small value index, which is defined as a valley value.

14. The control method of an automatic working system according to claim 1, wherein after said product signal is subjected to optimal filtering, said first signal point and said second signal point are then determined based on said product signal subjected to said optimal filtering.

15. The control method of an automatic working system according to claim 14, wherein an optimal filtering core of said optimal filtering is corresponding to said current signal generated by said signal generating apparatus.

16. The control method of an automatic working system according to claim 14, wherein said optimal filtering core of said optimal filtering is a detection signal in said working region defined by said boundary wire.

17. An automatic working system, comprising:
a signal generation apparatus, configured to generate a current signal;
a boundary wire, forming an electric loop with the signal generating apparatus, wherein said current signal flows by said boundary wire to generate an electromagnetic field; and
an automatic moving device, automatically moving and working in a working region defined by said boundary wire;
wherein:
said automatic moving device comprises a processor, a controller and a plurality of detection devices comprising a first induction coil located at a first position and a second induction coil located at a second position, each of the plurality of detection devices being configured to detect said electromagnetic field; said plurality of detection devices detect said electromagnetic field to generate a plurality of detection signals respectively the plurality of detection signals comprising a first detection signal generated by the first induction coil and a second detection signal generated by the second induction coil;
said processor receives said plurality of detection signals, and multiplies said plurality of detection signals including the first detection signal and the second detection signal to generate a product signal, and the direction of said product signal being kept same as that one of said plurality of detection signals;
a first signal point and a second signal point are determined based on said product signal;
characteristic values are generated based on parameters of said first signal point and said second signal point, said characteristic values are compared with preset thresholds to generate a comparison result which is transmitted to said controller;
said controller judges whether said one of said plurality of detection signals is interfered by noise comprising signal interference caused by an environment or a motor according to said comparison result; and
in response to said controller judging that said first detection signal is not interfered by the noise:
said controller judges whether or not a corresponding one of said plurality of detection devices is located in said working region encircled by said boundary wire; and
said controller sends a corresponding control command to control a direction of said automatic moving device based on whether or not the corresponding one of said plurality of detection devices is located in said working region encircled by said boundary wire.

18. The automatic working system according to claim 17, wherein said plurality of detection devices comprise a first detection device and a second detection device;
detecting said electromagnetic field by said first detection device and said second detection device to generate a first detection signal and a second detection signal respectively; and the direction of said product signal being kept same as that of said first detection signal;
said first detection signal is said one of said plurality of detection signals.

19. The automatic working system according to claim 18, wherein said first signal point is on said first detection signal and its position is corresponding to the position of a maximal value point of said product signal; and said second signal point is on said first detection signal and its position is corresponding to the position of a minimal value point of said product signal; or said first signal point is on said second detection signal and its position is corresponding to the position of a maximal value point of said product signal; and said second signal point is on said second detection signal and its position is corresponding to the position of a minimal value point of said product signal.

20. The automatic working system according to claim 18, wherein said first signal point is a maximal value point of said product signal; and said second signal point is a minimal value point of said product signal.

21. The automatic working system according to claim 18, wherein the characteristic values comprise an amplitude value of said first signal point, and said amplitude value is defined as a peak value; said characteristic values also comprise an amplitude value of said second signal point, and said amplitude value is defined as a valley value; said preset thresholds comprise a threshold value; the absolute values of said peak value and said valley value are compared with said threshold value respectively, if the absolute values of said peak value and said valley value are both larger than said threshold value, said first detection signal is judged not to be interfered by the noise, otherwise, said first detection signal is judged to be interfered by the noise.

22. The automatic working system according to claim 18, wherein said characteristic values comprise a time difference between said first signal point and said second signal point, which is defined as a peak-valley time difference; said preset thresholds value comprises an interval lower limit value and an interval upper limit value; said peak-valley time difference is compared with said interval lower limit value and said interval upper limit value, if said peak-valley time difference is larger than or equal to said interval lower limit value and smaller than or equal to said interval upper limit value, said first detection signal is judged not to be interfered, otherwise, said first detection signal is judged to be interfered by the noise.

23. The automatic working system according to claim 22, wherein said value ranges of said interval lower limit value and said interval upper limit value are based on a period of said current signal.

24. The automatic working system according to claim 18, wherein said characteristic values comprise an amplitude value difference between said first signal point and said second signal point, which is defined as a peak-valley amplitude difference; said preset thresholds value comprises an amplitude value; said peak-valley amplitude difference is compared with said amplitude value, if said peak-valley amplitude difference is smaller than said amplitude value, said first detection signal is judged not to be interfered, otherwise, said first detection signal is judged to be interfered by the noise.

25. The automatic working system according to claim 18, wherein if said controller judges that said first detection signal is not interfered by the noise, said processor compares a time sequence relation between said first signal point and said second signal point, said first detection device generating said first detection signal is judged to be located in or out said working region encircled by said boundary wire.

26. The automatic working system according to claim 25, wherein said controller sends a corresponding control command to control a direction of said automatic moving device according to a position relation between said first detection device and said boundary wire.

27. The automatic working system according to claim 18, wherein when said controller judges that said first detection signal is interfered by the noise, said controller judges that an effective signal is not received in such processing period.

28. The automatic working system according to claim 17, wherein said processor also comprises an optimal filter, after said product signal is subjected to optimal filtering, said first signal point and said second signal point are then determined based on said product signal subjected to said optimal filtering.

29. An automatic moving device, automatically moving and working in a working region defined by a boundary wire, and comprising:
a processor, a controller and a plurality of detection devices comprising a first induction coil located at a first position and a second induction coil located at a second position, each of the plurality of detection devices being configured to detect said boundary wire, wherein:
said plurality of detection devices detect said boundary wire to generate a plurality of detection signals respectively, the plurality of detection signals comprising a first detection signal generated by the first induction coil and a second detection signal generated by the second induction coil;
said processor receives said plurality of detection signals, and multiplies said plurality of detection signals including the first detection signal and the second detection signal to generate a product signal, and the direction of said product signal being kept same as that one of said plurality of detection signals;
a first signal point and a second signal point are determined based on said product signal;
characteristic values are generated based on parameters of said first signal point and said second signal point, said characteristic values are compared with preset thresholds to generate a comparison result which is transmitted to said controller;
said controller judges whether said one of said plurality of detection signals is interfered by noise comprising signal interference caused by an environment or a motor according to the comparison result; and
said controller, in response to judging that said first detection signal is not interfered by the noise:
judges whether or not a corresponding one of said plurality of detection devices is located in said working region encircled by said boundary wire; and
sends a corresponding control command to control a direction of said automatic moving device based on whether or not the corresponding one of said plurality of detection devices is located in said working region encircled by said boundary wire.

30. The automatic moving device according to claim 29, wherein said plurality of detection devices comprise a first detection device and a second detection device;
said first detection device and said second detection device detect said boundary wire to generate a first detection signal and a second detection signal respectively; and the direction of said product signal being kept same as that of said first detection signal;
wherein said first detection signal is said one of said plurality of detection signals.

31. The automatic moving device according to claim 30, wherein said first detection device and said second detection device are symmetric about a central axis of said automatic moving device.

32. The automatic moving device according to claim 30, wherein a transverse distance between said first detection device and said second detection device is larger than or equal to 80 mm.

33. The automatic moving device according to claim 30, wherein said first detection device and said second detection device are respectively located in different sides of the motor of said automatic moving device.

* * * * *